United States Patent
Robertson et al.

(10) Patent No.: US 9,290,266 B2
(45) Date of Patent: Mar. 22, 2016

(54) SPEED CONTROL ASSEMBLY AND METHODS OF USING SAME

(71) Applicant: Bell Helicopter Textron Inc., Fort Worth, TX (US)

(72) Inventors: Daniel B. Robertson, Southlake, TX (US); Dudley E. Smith, Arlington, TX (US); Carlos A. Fenny, Arlington, TX (US); Walter West Riley, Richardson, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 344 days.

(21) Appl. No.: 14/202,826

(22) Filed: Mar. 10, 2014

(65) Prior Publication Data

US 2015/0274287 A1    Oct. 1, 2015

Related U.S. Application Data

(60) Provisional application No. 61/798,862, filed on Mar. 15, 2013.

(51) Int. Cl.
*F16H 3/72*    (2006.01)
*B64C 27/12*   (2006.01)

(52) U.S. Cl.
CPC ............... *B64C 27/12* (2013.01); *F16H 3/724* (2013.01)

(58) Field of Classification Search
None
See application file for complete search history.

(56) References Cited

U.S. PATENT DOCUMENTS

| | | | | | |
|---|---|---|---|---|---|
| 1,270,028 | A | * | 6/1918 | Henderson | 318/8 |
| 2,924,991 | A | * | 2/1960 | Whiting | 475/7 |
| 3,977,812 | A | * | 8/1976 | Hudgins | 416/123 |
| 4,411,171 | A | * | 10/1983 | Fiala | 475/5 |
| 4,423,794 | A | * | 1/1984 | Beck | 180/165 |
| 5,029,655 | A | * | 7/1991 | Ebeling | 175/195 |
| 5,039,281 | A | * | 8/1991 | Johnston | 417/212 |
| 5,895,333 | A | * | 4/1999 | Morisawa et al. | 475/5 |
| 6,428,438 | B1 | * | 8/2002 | Bowen | 475/5 |
| 7,044,877 | B2 | * | 5/2006 | Ai | 475/5 |
| 7,371,201 | B2 | * | 5/2008 | Usoro | 475/5 |
| 8,167,754 | B2 | * | 5/2012 | Phillips | 475/5 |
| 8,197,373 | B2 | * | 6/2012 | Akutsu et al. | 475/5 |
| 8,585,521 | B2 | * | 11/2013 | Robinette et al. | 475/5 |
| 8,585,523 | B2 | * | 11/2013 | Yamada | 475/5 |

(Continued)

OTHER PUBLICATIONS

Kenneth Kaplan, Variable Ratios From Planetaries . . . How to Calculate the Speed of Any Element When All Elements Are Rotating, Aug. 17, 1967, 2 pages.

(Continued)

*Primary Examiner* — Dirk Wright
(74) *Attorney, Agent, or Firm* — Noah A. Tevis

(57) ABSTRACT

A speed control assembly includes an input drive shaft coupled to a first gear subassembly having a rotatable gear, a second gear subassembly coupled to an output drive shaft, and a linkage coupling the first and second gear subassemblies, wherein the input drive shaft, the first and second gear subassemblies, and the linkage are configured such that a rotational speed of the rotatable gear adjusts a ratio of a rotational speed of the output drive shaft to a rotational speed of the output drive shaft. In some embodiments, the first gear subassembly includes a sun gear coupled to the input drive shaft, one or more planet gears, and a ring gear as the rotatable gear. In some embodiments, the second gear subassembly includes a sun gear coupled to the output drive shaft, one or more planet gears, and a fixed ring gear.

16 Claims, 14 Drawing Sheets

(56) References Cited

U.S. PATENT DOCUMENTS

| | | |
|---|---|---|
| 8,840,500 B2 * | 9/2014 | Tamai et al. ........................ 475/5 |
| 8,939,858 B2 * | 1/2015 | Puiu et al. .......................... 475/5 |
| 8,992,361 B2 * | 3/2015 | Doleschel et al. ................. 475/5 |
| 2012/0149516 A1 * | 6/2012 | Larrabee et al. ................... 475/5 |
| 2012/0197472 A1 * | 8/2012 | He et al. ........................... 701/22 |
| 2014/0010652 A1 * | 1/2014 | Suntharalingam et al. ........ 416/1 |

OTHER PUBLICATIONS

Harry Walton, The How and Why of Mechanical Movements: Exactly How Machines Work: Engines, Turbines, Transmissions, Brakes, Clutches, Rockets, Atomic Generators, Gyroscopes, Guidance Systems, Jan. 1, 1968, 4 pages.

* cited by examiner

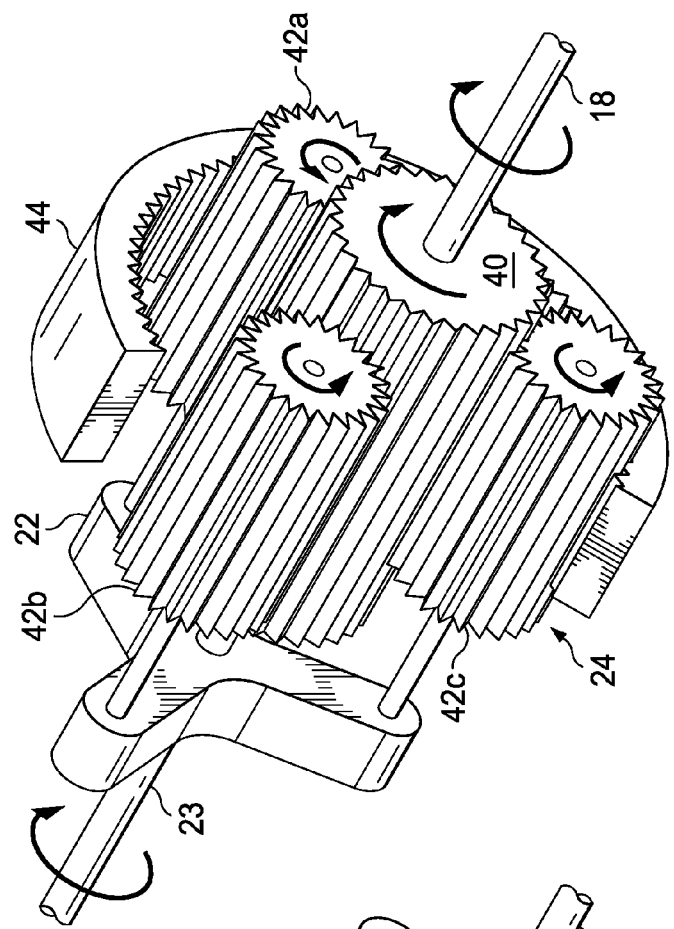
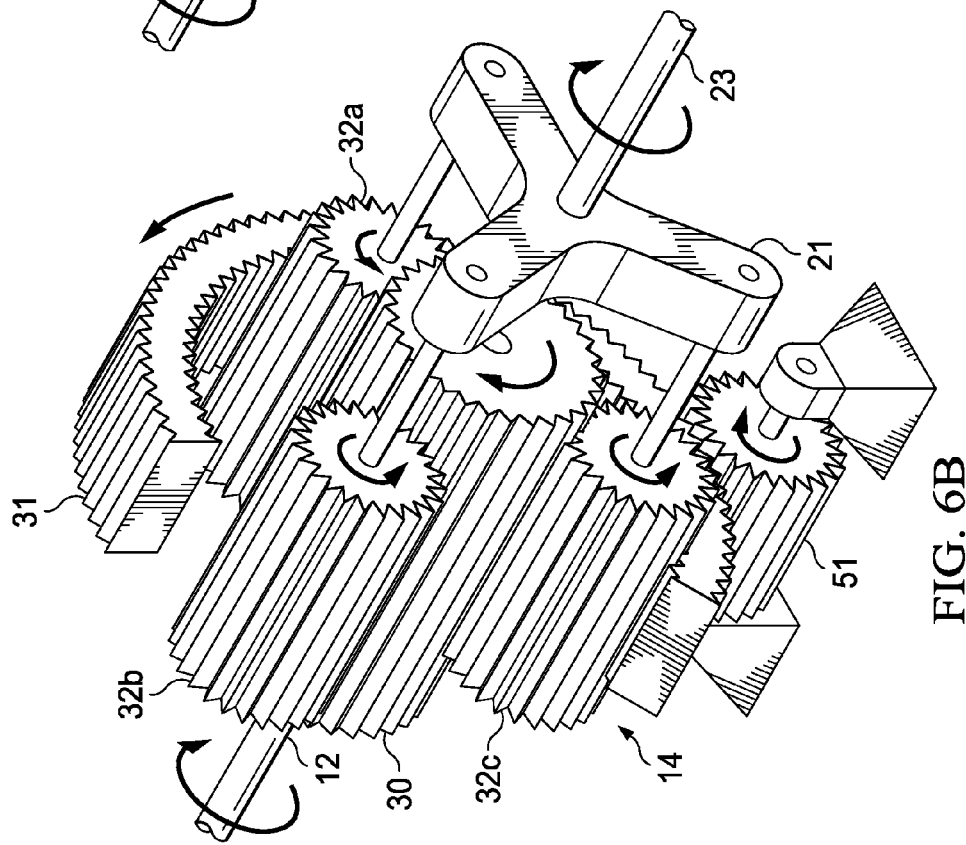

SPEED CONTROL ASSEMBLY AND METHODS OF USING SAME

CROSS-REFERENCE TO RELATED APPLICATION

This application claims the benefit of U.S. Provisional Application No. 61/798,862, filed Mar. 15, 2013.

STATEMENT REGARDING FEDERALLY SPONSORED RESEARCH OR DEVELOPMENT

Not Applicable.

BACKGROUND

The high speeds generated by helicopter tail rotors present hazards to helicopter crews, passengers, and bystanders during routine landing and takeoff, and especially in the course of high-risk applications such as military operations, search and rescue, and emergency medical services. A means for adjusting the speed of a helicopter tail rotor independent of a primary rotor would be beneficial in that the tail rotor could be stopped or reduced to safe speeds when the helicopter is not in flight but while the primary rotor is still engaged. However, countervailing design considerations have resulted in few, if any, helicopters capable of independent adjustment of the tail rotor speed. Thus, there is a continuing need to find new ways by which the rotational speeds of aircraft rotors, propellers, and proprotors can be reduced.

The high speeds of helicopter tail rotors, which may rise to nearly super-sonic levels, are also responsible for producing excess noise. Rotor noise presents a nuisance to the general public in terms of noise pollution as well as a strategic disadvantage during military operations in that the element of surprise may be prematurely compromised, jeopardizing aircraft personnel and mission objectives. Thus, the aviation industry continually seeks new ways by which the rotor noise of rotor-propelled aircraft can be reduced.

Noise issues are further complicated in that the sound produced by helicopter tail rotors changes with altitude because the air thickness decreases and distance from a listener increases at greater elevations. Thus, a need exists to find new ways by which noise from rotary aircraft can be dynamically controlled.

SUMMARY

In some embodiments of the disclosure, a speed control assembly is provided that includes an input drive shaft coupled to a first gear subassembly having a rotatable gear, a second gear subassembly coupled to an output drive shaft, and a linkage coupling the first gear subassembly to the second gear subassembly, wherein the input drive shaft, the first gear subassembly, the second-gear subassembly, and the linkage are configured such that a rotational speed of the rotatable gear adjusts a ratio of a rotational speed of the output drive shaft to a rotational speed of the input drive shaft. In some embodiments, the first gear subassembly may be a first epicyclic or planetary gear subassembly that includes a sun gear coupled to the input drive shaft, one or more planet gears, and the rotatable gear, and wherein the rotatable gear comprises a ring gear of the first epicyclic or planetary gear subassembly. In some embodiments, the second gear subassembly may be a second epicyclic or planetary gear subassembly that includes a sun gear coupled to the output drive shaft, one or more planet gears, and a fixed ring gear. In some embodiments, a counter-rotation device is coupled to the rotatable ring gear and configured to adjust a speed of counter-rotation of the rotatable ring gear relative to the sun gear coupled to the input drive shaft.

In some embodiments of the disclosure, a speed control assembly is provided that includes an input drive shaft coupled to one or more planet gears of a first epicyclic gear subassembly, an output drive shaft coupled to one or more planet gears of a second epicyclic gear subassembly, and a linkage coupling a ring gear of the first epicyclic gear subassembly to a ring gear of the second epicyclic gear subassembly, wherein the one or more planet gears of the first epicyclic gear subassembly are coupled to a rotatable sun gear and to the ring gear of the first epicyclic gear subassembly.

In other embodiments of the disclosure, a method of controlling the speed of an output drive shaft is provided that includes rotating an input drive shaft coupled to a gear subassembly comprising a rotatable ring gear, wherein an output drive shaft is mechanically coupled to the rotatable ring gear, and adjusting a drive speed ratio by controlling a rotational speed of the rotatable ring gear, wherein the drive speed ratio is the ratio of a rotational speed of the output drive shaft to a rotational speed of the input drive shaft. In an embodiment, the rotatable ring rotates in a radial direction opposite to a rotational direction of the input drive shaft.

In an embodiment, the auxiliary rotor of the method of controlling the speed of an auxiliary rotor is a tail rotor of a helicopter and the method further includes adjusting the noise generated by the tail rotor by adjusting the drive speed ratio. In an embodiment, the auxiliary rotor comprises an auxiliary rotor of a vehicle propulsion system and the method of controlling the speed of an auxiliary rotor further includes adjusting the drive speed ratio.

BRIEF DESCRIPTION OF THE DRAWINGS

For a more complete understanding of the present disclosure and the advantages thereof, reference is now made to the following brief description, taken in connection with the accompanying drawings and detailed description:

FIG. 6B is an oblique side view of the first epicyclic or planetary gear subassembly of FIG. 2.

FIG. 6C is an oblique side view of the second epicyclic or planetary gear subassembly of FIG. 2.

DETAILED DESCRIPTION

It should be understood at the outset that although an illustrative implementation of one or more embodiments are provided below, disclosed systems and methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As defined herein, the adjective "fixed" indicates that the fixed thing (e.g., a ring gear) does not move (e.g., rotate) relative to a housing or frame supporting the apparatus of which the fixed thing is a component. Unless otherwise specified, use of the terms "connect," "engage," "couple," "attach," or any other like term describing an interaction between elements is not meant to limit the interaction to direct interaction between the elements and may also include indirect interaction between the elements described. As used herein, the definitions of the terms "speed," "rotational speed," "rotation speed," and "speed of rotation" encompass both the concepts of angular speed (e.g., rotational speed) and rotational direction (e.g., clockwise or counterclockwise), except where context indicates otherwise.

In some cases, it may be desirable to provide a means for controlling the rotational speed of an auxiliary rotor independent of a primary rotor of a propulsion system. In some embodiments, an input shaft is coupled to a first epicyclic or planetary gear subassembly, a second epicyclic or planetary subassembly is coupled an output drive shaft, and a linkage couples the first epicyclic or planetary gear subassembly to the second epicyclic or planetary gear subassembly, wherein a rotatable ring gear of the first epicyclic or planetary gear subassembly may counter-rotate to adjust a ratio of the rotational speed of the output drive shaft to the rotational speed of the input drive shaft, hereinafter referred to as the "drive speed ratio" and represented by the formula $\omega_o:\omega_i$. In some embodiments, the speed control assembly may be coupled to the tail rotor of a helicopter and utilized to maneuver the helicopter, to control noise produced by the tail rotor, or a combination thereof.

Figure 1:
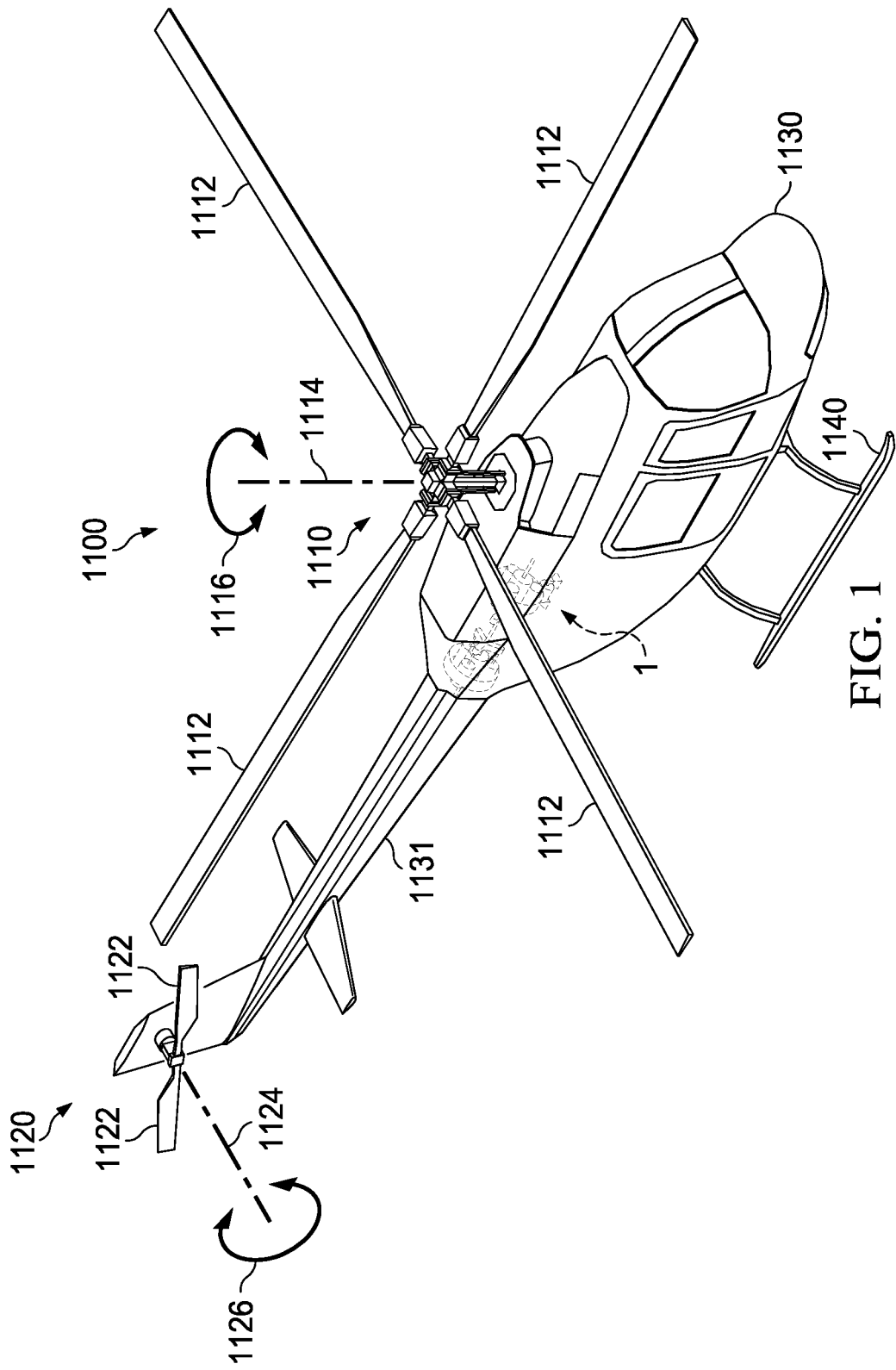
FIG. 1 is a perspective view of a helicopter according to an embodiment of the disclosure.

FIG. 1 is a perspective view of a helicopter 1100. Certain embodiments of the disclosure may be used with a helicopter such as helicopter 1100. However, it should be understood that the helicopter example is given merely for illustration purposes only. Embodiments of the present disclosure are not limited to any particular setting or application, and embodiments can be used with helicopters, tiltrotor aircraft, airplanes, sea vessels, other types of vehicles, or any other type of rotary shaft.

Helicopter 1100 includes a main rotor assembly 1110, a tail rotor assembly 1120, a fuselage 1130, and landing gear 1140. Main rotor assembly 1110 includes two or more blades 1112 that are rotated about an axis of rotation 1114 in either a clockwise direction or a counterclockwise direction as indicated by arrow 1116. Main rotor assembly 1110 generates a lift force that supports the weight of helicopter 1100 and a thrust force that counteracts aerodynamic drag. Main rotor assembly 1110 can also be used to induce pitch and roll of helicopter 1100.

Tail rotor assembly 1120 includes two or more blades 1122 that are rotated about an axis of rotation 1124 in either a clockwise direction or a counterclockwise direction as indicated by arrow 1126. Tail rotor assembly 1120 counters the torque effect created by main rotor assembly 1110 and allows a pilot to control the yaw of helicopter 1100.

Fuselage 1130 is the main body section of helicopter 1100. Fuselage 1130 optionally holds the crew, passengers, and/or cargo and houses the engine, transmission, gear boxes, drive shafts, control systems, etc. that are needed to establish an operable helicopter. Landing gear 1140 is attached to fuselage 1130 and supports helicopter 1100 on the ground and allows it to take off and land.

Speed control assembly 1 may be situated within the tail portion 1131 of the fuselage 1130. Speed control assembly 1 allows the speed of rotation around axis of rotation 1124 of the tail rotor blades 1122 to be independent of the speed of rotation of blades 1112 around axis of rotation 1114. In various embodiments, the output drive shaft of a speed control assembly of the disclosure may be coupled to an auxiliary rotor of a propulsion system. In some embodiments, the propulsion system may be a propulsion system of a vehicle. The vehicle may be a land vehicle, sea craft, a spacecraft, an aircraft, or any combination thereof. The vehicle may be an aircraft, such as a helicopter, an airplane, a tiltrotor, or other rotary aircraft. The vehicle may be a sea craft such as a boat, a submarine, or a submersible. In an embodiment, the vehicle comprises a helicopter and the auxiliary rotor comprises the tail rotor of a helicopter. The vehicle may be a land vehicle, such as a sport utility vehicle or a car. The vehicle may also be a vehicle capable of traversing two or more terrains such as a hovercraft. The vehicle may be a manned vehicle, an unmanned vehicle (e.g., a drone), or capable of operating in both manned and unmanned capacities. The vehicle may be a remote controllable, autonomous, semi-autonomous, or any combination thereof. The vehicle may also be a hobby vehicle, a toy vehicle, a functional replica, or any combination of any of the vehicles described herein.

Figure 2:
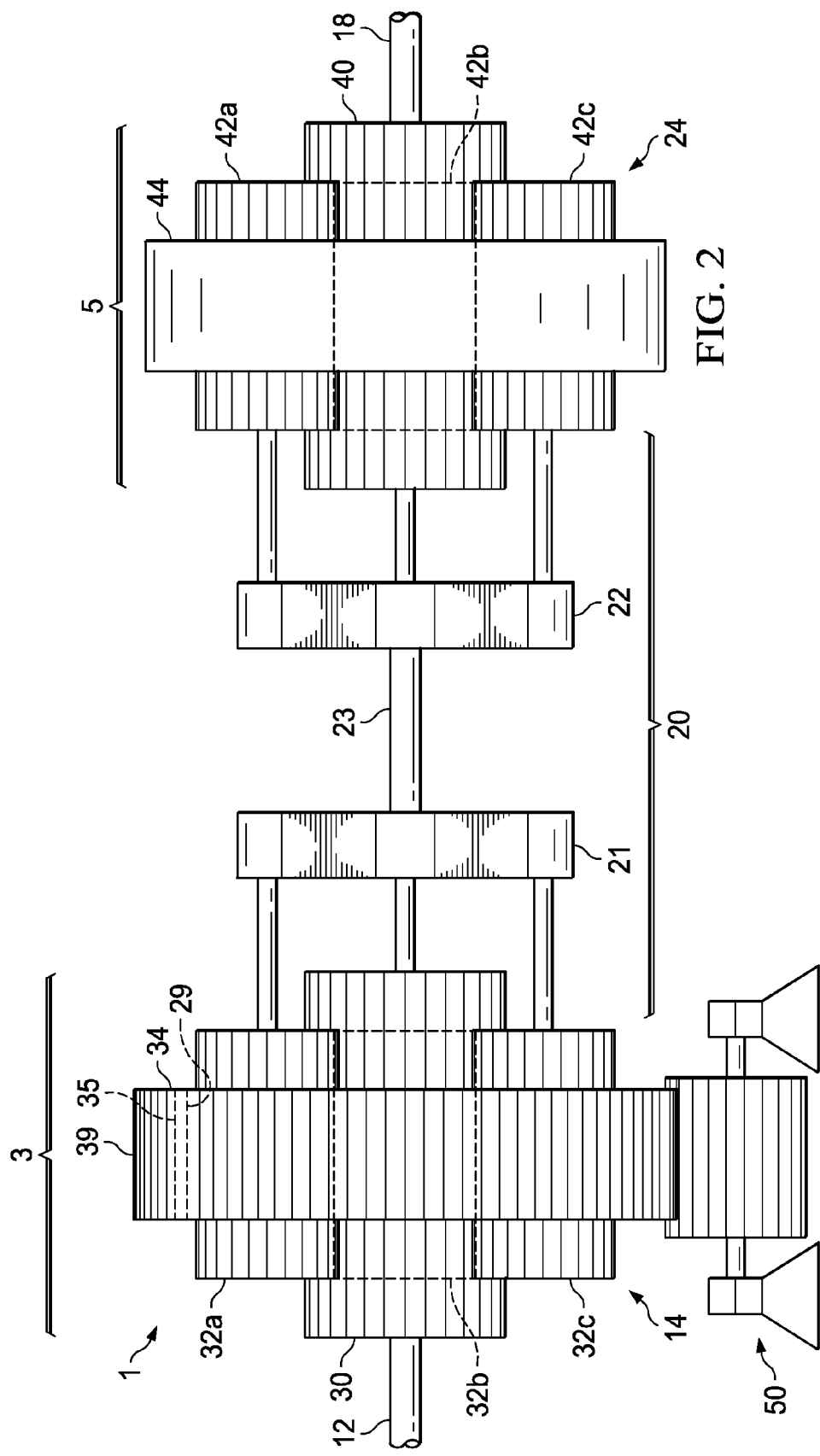
FIG. 2 is an orthogonal right side view of a speed control assembly according to an embodiment of the disclosure.

Referring now to FIG. 2, an orthogonal right side view of a speed control assembly 1 in accordance with an embodiment of the disclosure is shown. The speed control assembly 1 generally comprises an input drive shaft 12 coupled to a first gear subassembly 3, a second gear subassembly 5 coupled to an output drive shaft 18, and a linkage 20 coupling the first gear subassembly 3 to the second gear subassembly 5. The first gear subassembly 3 may comprise a rotatable gear, for example a rotatable ring gear 34. The second gear subassembly 5 may comprise a fixed gear, such as a fixed ring gear 44. In various embodiments, the location of the rotatable ring gear 34 and the fixed ring gear 44 may be reversed such that first gear subassembly 3 comprises fixed ring gear 44 and second gear subassembly 5 comprises rotatable ring gear 34. In various embodiments, the first gear subassembly 3 comprises a first epicyclic or planetary gear subassembly 14 comprising a sun gear 30, planet gears 32a, 32b, 32c, and rotatable ring gear 34. In various embodiments, the second gear subassembly 5 comprises a second epicyclic or planetary gear subassembly 24 comprising a sun gear 40, planet gears 42a, 42b, 42c, and a fixed ring gear 44. In various embodiments, the linkage 20 comprises a first carrier 21 coupled to each of planet gears 32a, 32b, 32c, a second carrier 22 coupled to each of planet gears 42a, 42b, 42c, and an intermediate shaft 23 coupled on opposite ends to each of the carriers 21, 22. In various embodiments, the speed control assembly 1 also comprises a rotation speed adjustment device 50 in contact with a surface of the rotatable gear, such as an outer circumferential surface 39 of the rotatable ring gear 34. The rotation speed adjustment device 50 may be configured to adjust a rotational speed of the rotatable ring gear 34.

Figure 3A:
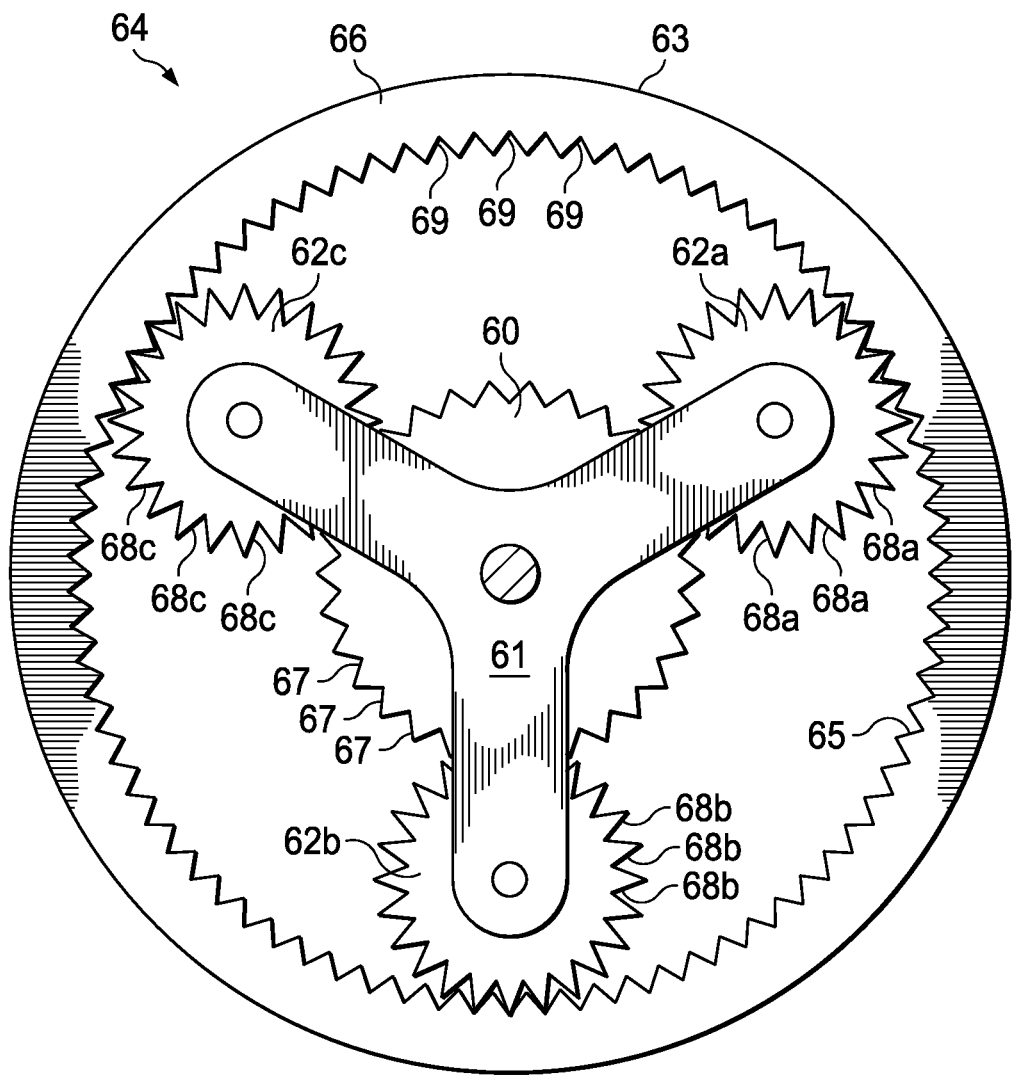
FIG. 3A is a orthogonal rear view of an epicyclic or planetary gear subassembly according to an embodiment of the disclosure.

Epicyclic or planetary gear subassemblies according to various embodiments of the disclosure may be epicyclic or planetary gear subassemblies. Referring to FIG. 3A, an orthogonal rear view of an epicyclic or planetary gear subassembly 64 in accordance with an embodiment of the disclosure may generally comprise a sun gear 60, one or more planet gears 62a, 62b, 62c, and a ring gear 66. The carrier 61, other structural features of the speed control assembly, housing containing or providing support for the speed control assembly, or any combination thereof may prevent non-rotational movement of the sun gear 60, the one or more planet gears 62a, 62b, 62c, the ring gear 66, or any combination thereof. The one or more planet gears 62a, 62b, 62c are radially bounded by an outer circumferential surface 63 of the sun gear and an inner circumferential surface 65 of the ring gear 66. Axial rotation of the sun gear 60 drives axial rotation of each planet gear 62a, 62b, 62c.

Figure 3B:
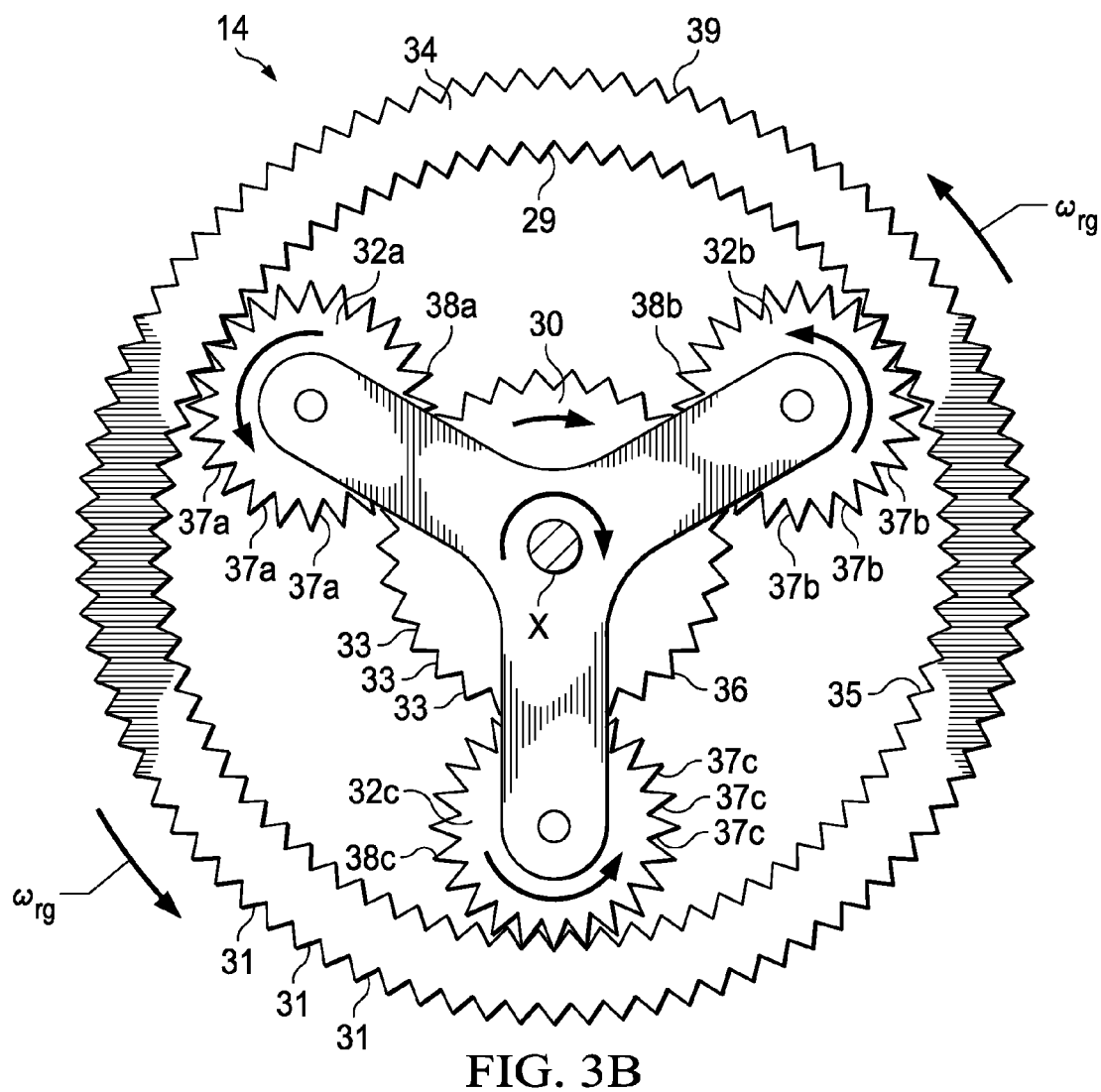
FIG. 3B is an orthogonal rear view of the first epicyclic or planetary gear subassembly of FIG. 2.

Referring to FIG. 3B, an orthogonal rear view of the epicyclic or planetary gear subassembly of FIG. 2 is shown. The sun gear 30, planet gears 32a, 32b, 32c, rotatable ring gear 34, or any combination thereof may rotate in a clockwise direction, a counterclockwise direction, or, at different times, in both clockwise and counterclockwise directions. Axial rotation of sun gear 30 may drive axial rotation of planet gears 32a, 32b, 32c in a direction opposite of sun gear 30. The rotatable ring gear 34 may also rotate in the same direction as sun gear 30, in a direction opposite of sun gear 30, or, at different times, in both the same and opposite directions of sun gear 30. The axial rotation of rotatable ring gear 34 may drive the axial rotation of planet gears 32a, 32b, 32c in the same rotational direction as rotatable ring gear 34. Rotation of rotatable ring gear 34 may drive planetary rotation of planet gears 32a, 32b, 32c in the opposite rotational direction of rotatable ring gear 34. Axial rotation of sun gear 30 may drive planetary rotation of planet gears 32a, 32b, 32c in the same rotational direction as sun gear 30. Simultaneous rotation of sun gear 30 and rotatable ring gear 34 may drive rotation of planet gears 32a, 32b, 32c in the same direction, the opposite direction, or, at different times, in both the same and opposite directions as sun gear 30, rotatable ring gear 34, or a combination thereof. The direction of planetary rotation of planet gears 32a, 32b, 32c relative to each of sun gear 30 and rotatable ring gear 34 depends on the ratio of the rotational speed $\omega_{sg}$ of sun gear 30 to the rotational speed $\omega_{rrg}$ of the rotatable ring gear 34. In an embodiment, the rotatable ring gear 34 rotates counter to the axial rotation of sun gear 30, thereby reducing a speed of planetary rotation $\omega_{pg}$ of planet gears 32a, 32b, 32c.

Figure 3C:
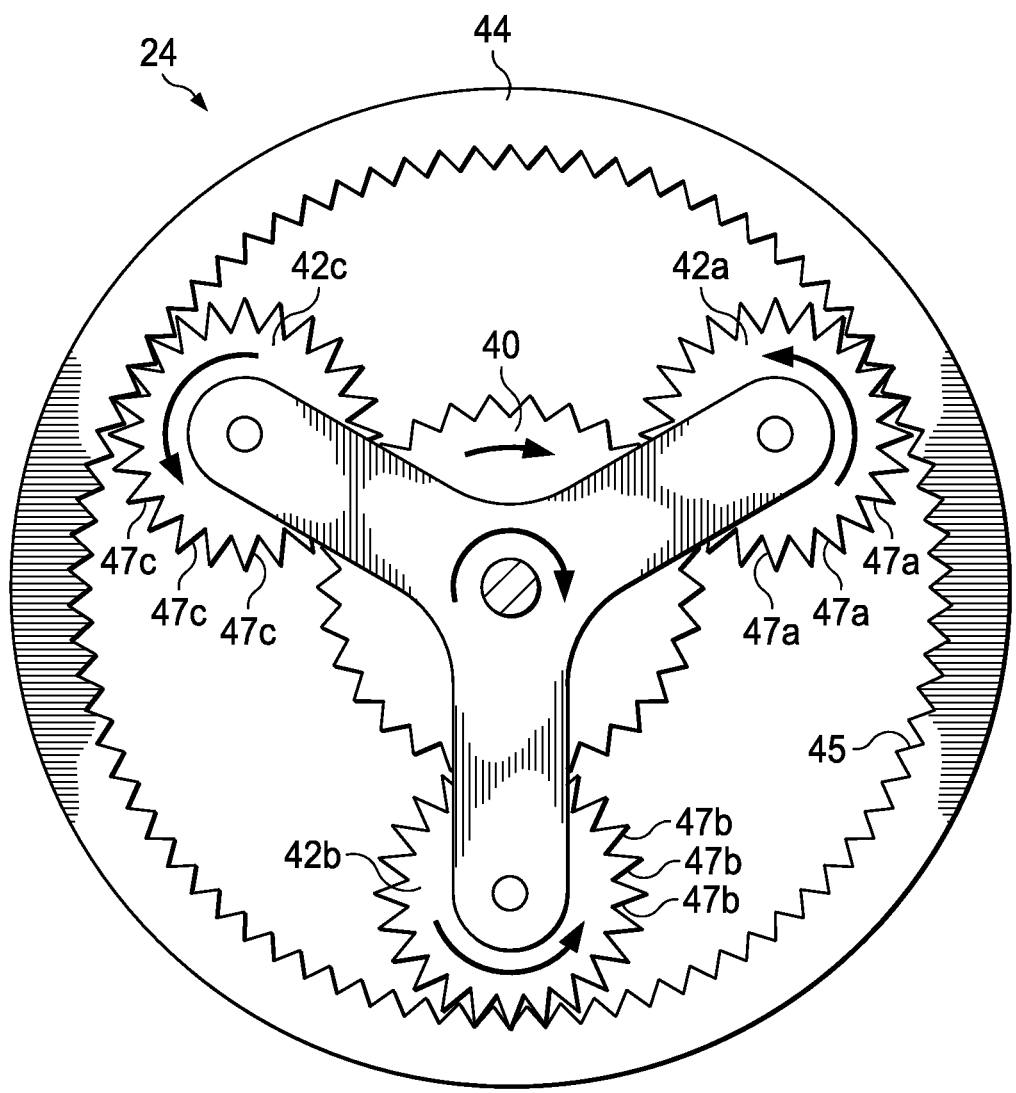
FIG. 3C is an orthogonal front view of the second epicyclic or planetary gear subassembly of FIG. 2.

Referring to FIG. 3C, an orthogonal front view of the second epicyclic or planetary gear subassembly 24 of FIG. 2 is shown. Similar to the first epicyclic or planetary gear subassembly 14, sun gear 40 may rotate clockwise, counterclockwise, or, at different times, both clockwise and counterclockwise. Also similar to the first epicyclic or planetary gear subassembly 14, axial rotation of sun gear 40 drives axial counter-rotation of planet gears 42a, 42b, 42c and planetary rotation of planet gears 42a, 42b, 42c in the same direction as the axial rotation of sun gear 40. In an embodiment, ring gear 44 is fixed in position (e.g., stationary) and thus does not rotate.

Gears of the epicyclic or planetary gear subassemblies may engage each other, other components of the speed control assembly, or a combination thereof via a means for engaging. In some embodiments, the means for engaging comprises interlocking splines, splines 67, 68a, 68b, 68c, 69 shown in FIG. 3A for example. Examples of suitable splines include but are not limited to parallel key splines, involute splines, crowned splines, serrations, helical splines, and the like. In other embodiments, the gears engage each other, other components of the speed control assembly, or a combination thereof via frictional engagement maintained between the surfaces shared between the gears, other components of the speed control assembly, or a combination thereof. In some embodiments, materials of the circumferential surfaces of the gears, other components of the speed control assembly, of a combination thereof comprise a coefficient of friction that allows for a desired amount of slippage under predetermined conditions. Such slippage may reduce the risk of mechanical failure during operation of the speed control assembly. In other embodiments, the epicyclic or planetary gear subassemblies, components of the speed control assembly, or a combination thereof are engaged with one another via a combination of interlocking splines and frictionally engaged surfaces.

Figure 4A:
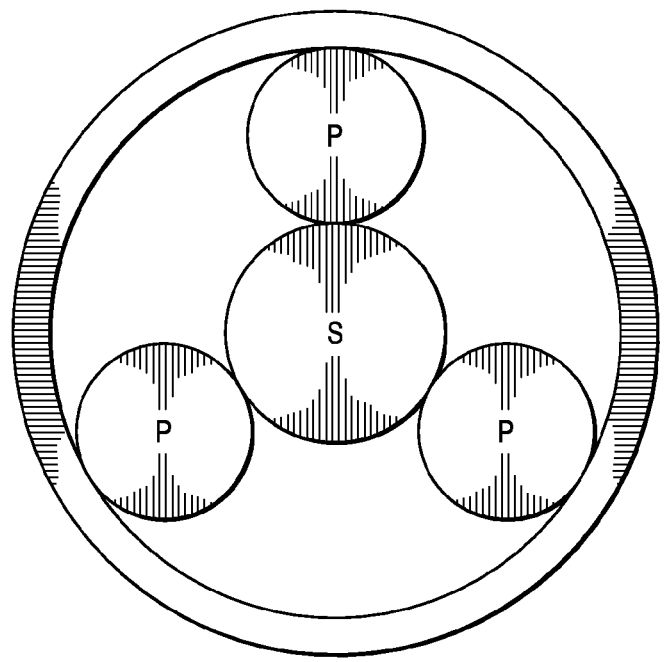
FIGS. 4A-4B are orthogonal rear views of sun-planet configurations of epicyclic or planetary gear subassemblies according to various embodiments of the disclosure.
Figure 4B:
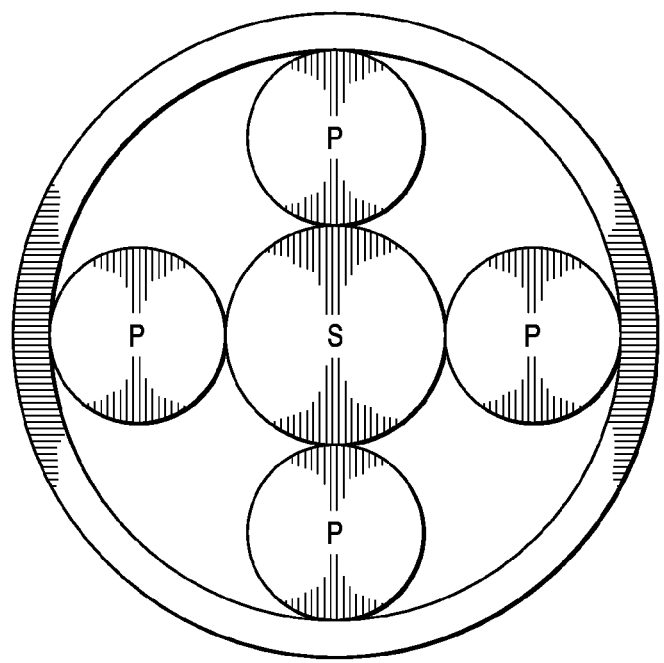

Various epicyclic or planetary gear subassemblies in accordance with embodiments of the disclosure may generally comprise one or more planet gears. The number of planet gears of the first and the second gear sub-assemblies may be the same or different. In an embodiment, each of the first gear subassembly, the second gear subassembly, or both comprise three planet gears. In some embodiments, each of the first gear subassembly, the second gear subassembly, or both comprise fewer (e.g., two) or more (e.g. four or five) planet gears. FIGS. 4A and 4B illustrate simple epicyclic or planetary gear subassemblies comprising three and four planet gears (P) revolving around a single sun gear (S), respectively. In other embodiments, the first gear subassembly, the second gear subassembly, or a combination thereof comprises a compound epicyclic or planetary gear arrangement. The first gear subassembly, the second gear subassembly, or a combination thereof may comprise a meshed-planet epicyclic or planetary gear arrangement, a stepped-planet epicyclic or planetary gear arrangement, a multi-stage epicyclic or planetary gear arrangement, or a combination thereof.

Figure 5A:
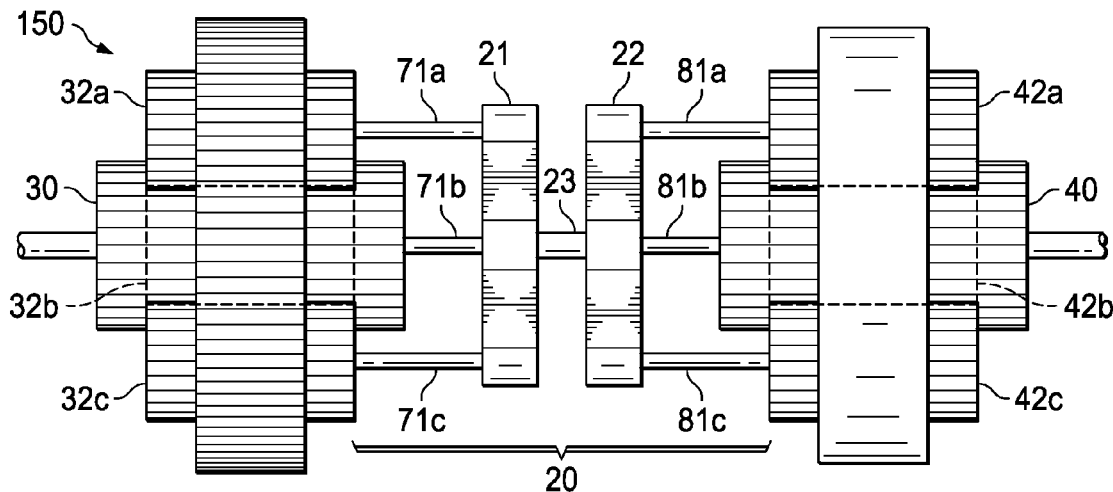
FIG. 5A-5C are orthogonal side views of linkages according to embodiments of the disclosure.
Figure 5B:
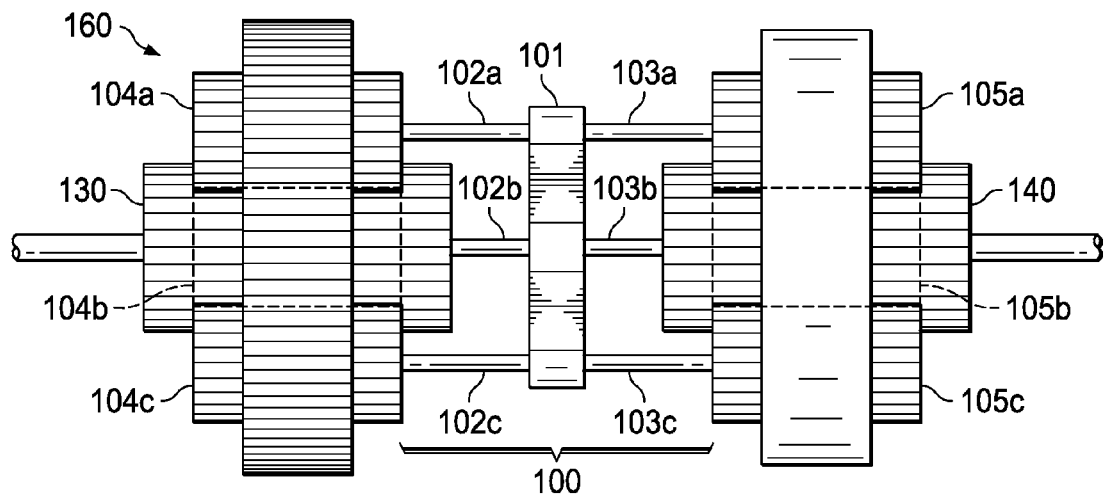

The linkage coupling the first epicyclic or planetary gear subassembly to the second epicyclic or planetary gear subassembly may comprise a linkage that transfers the planetary rotations of planet gears 32a, 32b, 32c to planet gears 42a, 42b, 42c. Referring to FIG. 5A, which shows an orthogonal side view of linkage 20 of FIG. 2, some embodiments comprise a first carrier 21, a second carrier 22, a shaft 23 coupling the first carrier 21 and the second carrier 22, and shafts 71a, 71b, 71c, 81a, 81b, 81c coupling each of planet gears 32a, 32b, 32c, 42a, 42b, 42c to the first carrier 21 and the second carrier 22. FIG. 5B shows an orthogonal side view of a linkage 100 of speed control assembly 160 in accordance with an embodiment of the disclosure. The linkage 100 comprises a carrier 101, shafts 102a, 102b, 102c, and shafts 103a, 103b, 103c. Shafts 102a, 102b, 102c couple each of planet gears 104a, 104b, 104c to carrier 101, respectively. Similarly, each of shafts 103a, 103b, 103c couple planet gears 105a, 105b, 105c to carrier 101. Each pair of shafts 102a/103a, 102b/103b, 102c/103c may comprise a single shaft (e.g., 102a and 103a are integral portions of the same shaft), may be distinct from one another (e.g., shaft 102a and shaft 103b are separate individual shafts), or a combination thereof (e.g., shafts 102a and 103a are integral portions of the same shaft, shaft 102b is a separate shaft from shaft 103b). Each of the shafts described in connection with FIGS. 5A and 5B may be coupled to the corresponding planet gear such that the shaft rotates freely around said shaft's axis of rotation independent of the rotation of the planet gear (around the planet gear's axis of rotation), independent of the rotation of the carrier, or a combination thereof.

Figure 5C:
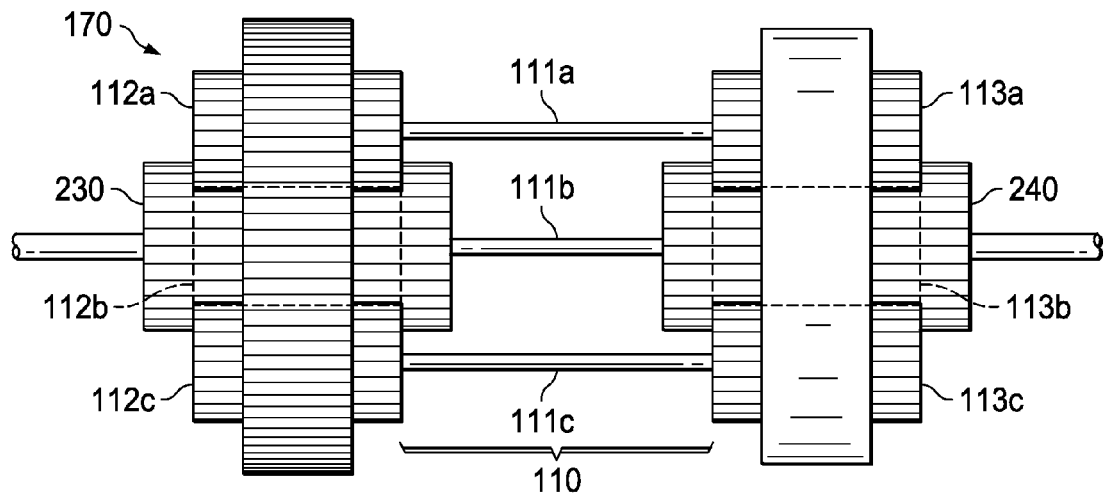

Referring to FIG. 5C, an orthogonal side view of a linkage 110 of speed control assembly 170 in accordance with an embodiment of the disclosure is shown. Linkage 110 generally comprises intermediate shafts 111a, 111b, and 111c. Shaft 111a couples planet gear 112a to planet gear 113a, shaft 111b couples planet gear 112b to planet gear 113b, and shaft 111c couples planet gear 112c to planet gear 113c. Intermediate shafts 111a, 111b, and 111c are affixed to planet gears 112a and 113a, planet gears 112b and 113b, and planet gears 112c and 113c, respectively, such that the planetary rotations of intermediate shafts 111a, 111b, and 111c are in unison with planet gears 112a, 113a,112b,113b, 112c, 113c affixed thereto.

Referring again to the linkages shown in FIGS. 5A and 5B, one or both of the sun gears 30, 40, 130, 140 may optionally be coupled to the nearest carrier 21, 22, 101 via an additional shaft, thereby providing additional mechanical support to regions of speed control assemblies 150 and 160 that are subject to the most intense of the internal stresses and strains during operation. Each optional shaft may rotate around the shaft's axis of rotation independent of the rotation of the sun gear, the carrier, or a combination thereof. Similarly, the sun gears 230, 240 of FIG. 5C may optionally be linked with a shaft to improve mechanical support.

It should be noted that the linkages shown in FIGS. 5A, 5B, and 5C are a few exemplary embodiments of linkages suitable for use in various speed control assemblies of the disclosure and are not intended to constitute an exhaustive list. For example, linkages suitable for use with mesh-type epicyclic or planetary gear subassemblies, step-type epicyclic or planetary gear subassemblies, multi-stage epicyclic or planetary gear subassemblies, or any combination thereof, also fall within the scope of the disclosure.

Figure 6A:
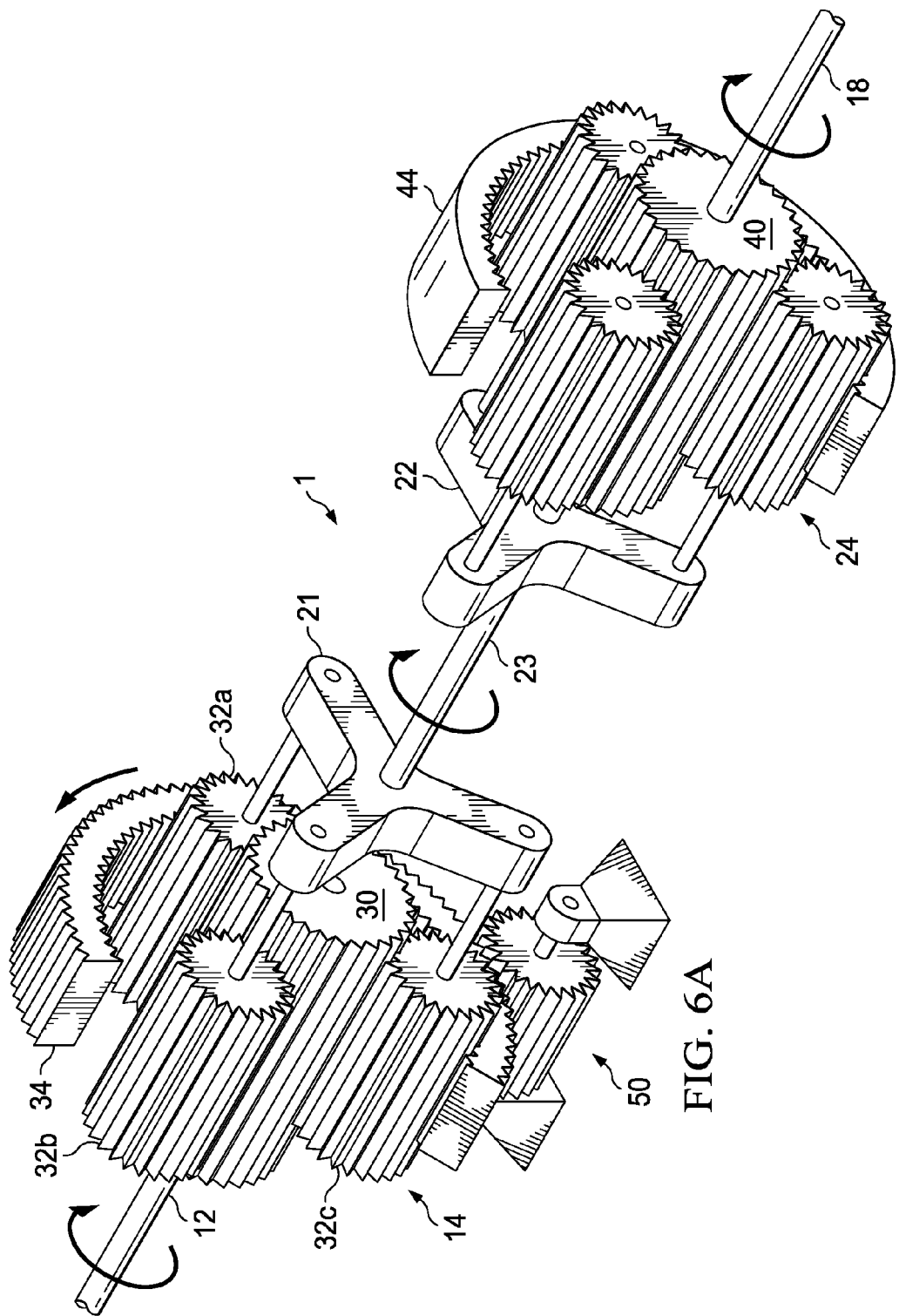
FIG. 6A is an oblique side view of a speed control assembly of FIG. 2.

Referring now to FIGS. 6A, 6B, and 6C, oblique side views show the mechanical relationships between the components of the speed control assembly 1, the first epicyclic or planetary gear subassembly 14, and the second epicyclic or planetary gear subassembly 24, respectively. The mechanical relationships shown in FIGS. 6A-6C illustrate an exemplary embodiment wherein the input drive shaft 12, the first epicyclic or planetary gear subassembly 14, the second epicyclic or planetary gear subassembly 24, and the linkage 20 may be configured such that a rotational speed of the rotatable gear adjusts a drive speed ratio $\omega_o:\omega_i$. Input drive shaft 12 may be integrally or mechanically coupled to sun gear 30 such that the rotation of input drive shaft 12 drives the rotation of sun gear 30. As shown in FIGS. 3B, 6A, and 6B sun gear 30 may engage each of planet gears 32a, 32b, 32c by interlocking splines 33 of sun gear 30 distributed along an outer circumferential surface 36 of sun gear 30 with splines 37a, 37b, and 37c distributed respectively along outer circumferential surfaces 38a, 38b, and 38c of planet gears 32a, 32b, 32c. As shown in FIGS. 3C, 6A, and 6C, rotatable ring gear 34 may engage planet gears 32a, 32b, 32c by interlocking inner splines 29 of the rotatable ring gear 34, which are distributed along an inner circumferential surface 35 of the rotatable ring gear 34 with splines 37a, 37b, and 37c of planet gears 32a, 32b, 32c. The rotation speed adjustment device 50 may engage rotatable ring gear 34 by interlocking splines 51 of the rotation speed adjustment device 50 with outer splines 31 distributed along an outer circumferential surface 39 of the rotatable ring gear 34. Similar to the first epicyclic or planetary gear subassembly 14, the fixed ring gear 44, planet gears 42a, 42b, 42c, and sun gear 40 of the second epicyclic or planetary gear subassembly 24 are engaged via interlocking splines 47a, 47b, 47c, 43, 45 and output drive shaft 18 is integrally or mechanically coupled to sun gear 40. The first and second carriers 21 and 22 may be coupled to the planet gears 32a, 32b, 32c, 42a, 42b, 42c of the first and second epicyclic or planetary gear subassemblies 14, 24 as previously described herein. Intermediate shaft 23 may be fixedly coupled to the carriers 21, 22 at opposite ends of intermediate shaft 23, and may be integrally or mechanically joined to said carriers 21, 22 such that the carriers 21, 22 and the intermediate shaft 23 rotate at the same rotational speed.

The rotation speed adjustment device may comprise any means suitable for adjusting a rotatable speed of the rotatable gear. The rotation speed adjustment device 50 may be any device suitable for increasing a rotational speed of a rotatable gear, decreasing a rotational speed of a rotatable gear, stopping rotation of a rotatable gear, or any combination thereof. The rotation speed adjustment device may comprise a brake, a motor, any plurality thereof, or any combination thereof. Brakes suitable for the rotation speed adjustment device include but are not limited to a hydraulic brake, a hydraulic pump, an electric brake, a mechanical brake, an electromagnetic brake, any plurality thereof, or any combination thereof. Motors suitable for the rotation speed adjustment device include but are not limited to a hydraulic motor, an electric motor, a combustion engine, any plurality thereof, or any combination thereof, and specifically include otherwise existing motors within the airframe or on the vehicle.

The rotation speed adjustment device may be coupled to the rotatable gear, and may be configured to adjust the rotational speed $\omega_{rg}$ of the rotatable gear coupled thereto. The rotation speed adjustment device may function as a brake, a drive motor, or a combination thereof in relation to the rotatable gear. In various embodiments of the first gear subassembly, the rotation speed adjustment device may drive axial counter-rotation of the rotatable gear relative to axial rotation of the sun gear, to the axial rotation of the rotatable gear in the same direction as the axial rotation of the sun gear, or, at different times, a combination thereof. In an embodiment the rotation speed adjustment device comprises a counter-rotation device coupled to a rotatable ring gear of an epicyclic or planetary gear subassembly and configured to adjust a speed of counter-rotation of the rotatable ring gear relative to a sun gear of the epicyclic or planetary gear subassembly. The rotation speed adjustment device may engage the rotatable gear by interlocking splines distributed around an outer circumferential surface of the rotation speed adjustment device with splines distributed around an outer circumferential surface of the rotatable ring gear.

Figure 7:
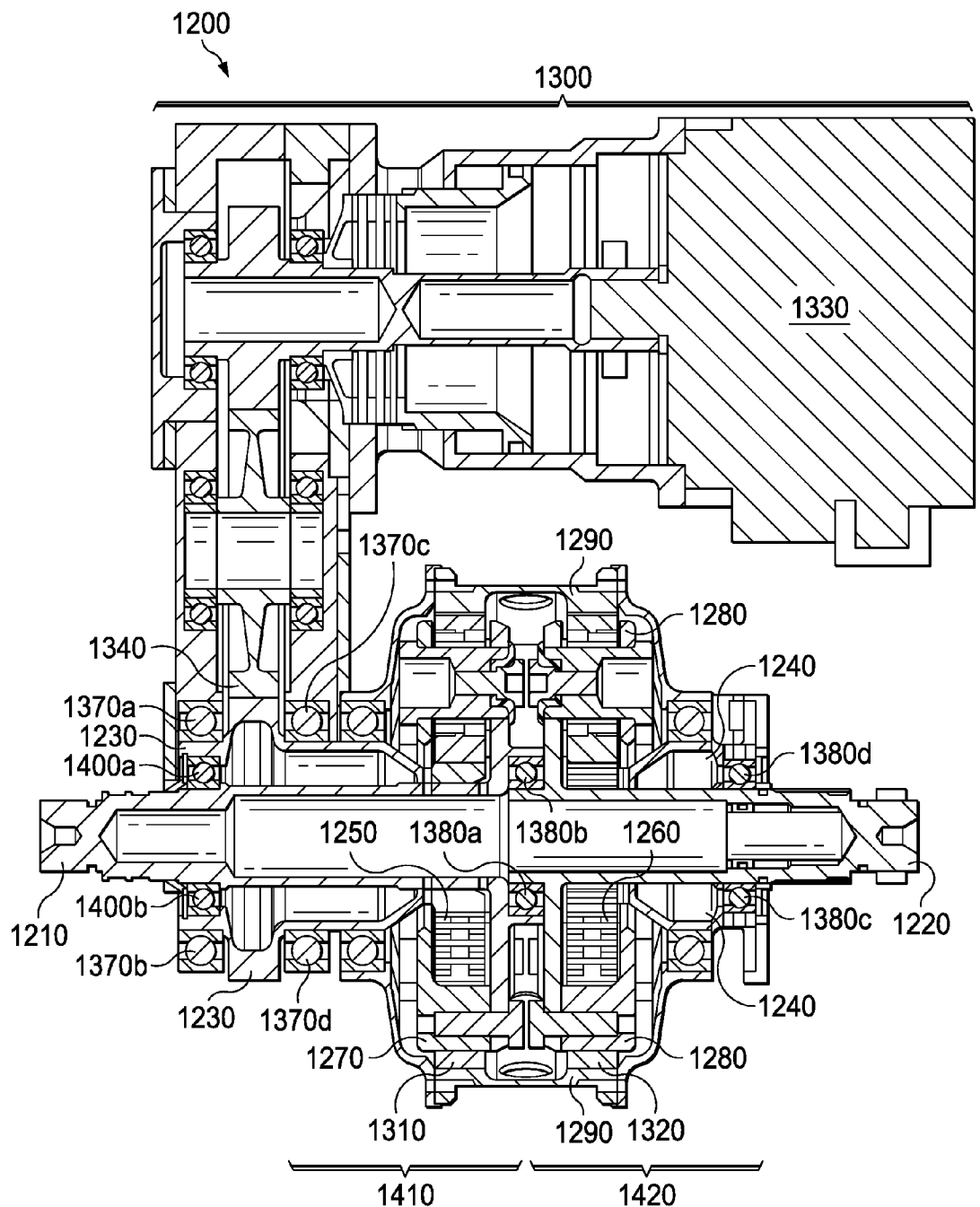
FIG. 7 is an orthogonal right side view of a speed control assembly according to an embodiment of the disclosure.

In some embodiments, the rotatable gear may be a gear other than a ring gear. For example, the rotatable gear may be a planet gear or a sun gear. In an embodiment, the rotatable gear comprises a sun gear. Referring to FIG. 7, an orthogonal side view of a speed control assembly 1200 comprising a rotatable sun gear 1230 in accordance with an embodiment of the disclosure is shown. Speed control assembly 1200 comprises an input drive shaft 1210 coupled to one or more planet gears 1250 of a first epicyclic or planetary gear subassembly 1410, an output drive shaft 1220 coupled to one or more planet gears 1260 of a second epicyclic or planetary gear subassembly 1420, and a linkage 1290 coupling a ring gear 1310 of the first epicyclic or planetary subassembly 1410 to a ring gear 1320 of the second epicyclic or planetary gear subassembly 1420. Carrier 1270 of the first epicyclic or planetary gear subassembly 1410 may be coupled to the input drive shaft 1210 and supports each of the one or more planet gears 1250, allowing coordinated planetary rotational movement of each of the one or more planet gears 1250. Each of the planet gears 1250 are coupled to and mechanically engaged with a rotatable sun gear 1230 of the first epicyclic or planetary gear subassembly 1410 and ring gear 1310. Rotatable sun gear 1230 may be coupled to and mechanically engaged with rotation speed adjustment device 1300. Rotation speed adjustment device 1300 comprises a drive motor 1330 which drives a gear 1340. Gear 1340 may be coupled to and mechanically engaged with rotatable sun gear 1230.

Carrier 1280 of the second epicyclic or planetary gear subassembly 1420 may be coupled to the output drive shaft 1220 and supports each of the one or more planet gears 1260, allowing coordinated planetary rotational movement of each of the one or more planet gears 1260. Each of planet gears 1260 are coupled to and mechanically engaged with a fixed sun gear 1240 of the second epicyclic or planetary gear subassembly 1420 and ring gear 1320. Ring gears 1310 and 1320 are coupled together via linkage 1290, but are otherwise free to rotate.

Still referring to FIG. 7, rotation of the input drive shaft 1210 may be facilitated by bearings 1400a, 1400b, 1380a, 1380b. Rotation of the output drive shaft 1220 may be facilitated by bearings 1380a, 1380b, 1380c, 1380d. Rotation of the sun gear 1230 may be facilitated by bearings 1370a, 1370b, 1370c, 1370b, 1400a, 1400b. The input drive shaft 1210 may be coupled to one or more of the planet gears 1250 such that rotation of the input drive shaft 1210 may drive planetary rotation of the one or more planet gears 1250 in the same direction as the input drive shaft 1210. The output drive shaft 1220 may be coupled to one or more of the planet gears 1260 such that planetary rotation of the one or more planet gears 1260 drives rotation of the output drive shaft in the same rotational direction as the planetary rotations of the one or more planet gears 1260. Rotation speed adjustment device 1300 may be used to adjust the drive speed ratio $\omega_o:\omega_i$ of speed control assembly 1200 by controlling the rotational speed of rotatable sun gear 1230. For example, rotation speed adjustment device 1300 may be used to counter-rotate sun gear 1230 such that output drive shaft 1220 rotates at a rotational speed less than the rotational speed of input drive shaft 1210 (e.g., $\omega_o:\omega_i$ decreases). Planetary rotation of the one or more planet gears 1250 in the same rotational direction as input drive shaft 1210 may be offset by the counter-rotation of the rotatable sun gear 1230 as the one or more planet gears 1250 are couple to and mechanically engaged with both the input drive shaft 1210 and the rotatable sun gear 1230 at the same time.

In various embodiments, motor 1330 and gear 1340 may be replaced with a brake that is coupled to ring gear 1310 or any gear of the second epicyclic or planetary gear subassembly 1420. In such cases, when the input shaft is spinning and the brake is applied, the sun gear 1230 will spin freely.

The speed control assembly in accordance with various embodiments of the disclosure may be used to rotate any rotating part of any mechanical device. In various embodiments, a speed control assembly in accordance with an embodiment of the disclosure drives rotation of a thrust-providing mechanical device. The output drive shaft may rotate a rotor, a propeller, an impeller, a screw (e.g., the screw of a screw-propelled vehicle), any plurality thereof, or any combination thereof. In an embodiment, a speed control assembly of the disclosure drives rotation of a tail rotor of a helicopter. The speed control assembly may couple the helicopter's engine to the tail rotor within a fuselage of a helicopter. In an embodiment, the helicopter engine may be coupled to the input drive shaft of the speed control assembly and the output drive shaft of the speed control assembly may be coupled to the tail rotor of the helicopter. In another embodiment, the speed control assembly of the disclosure drives rotation of a submersible propeller.

Figure 8A:
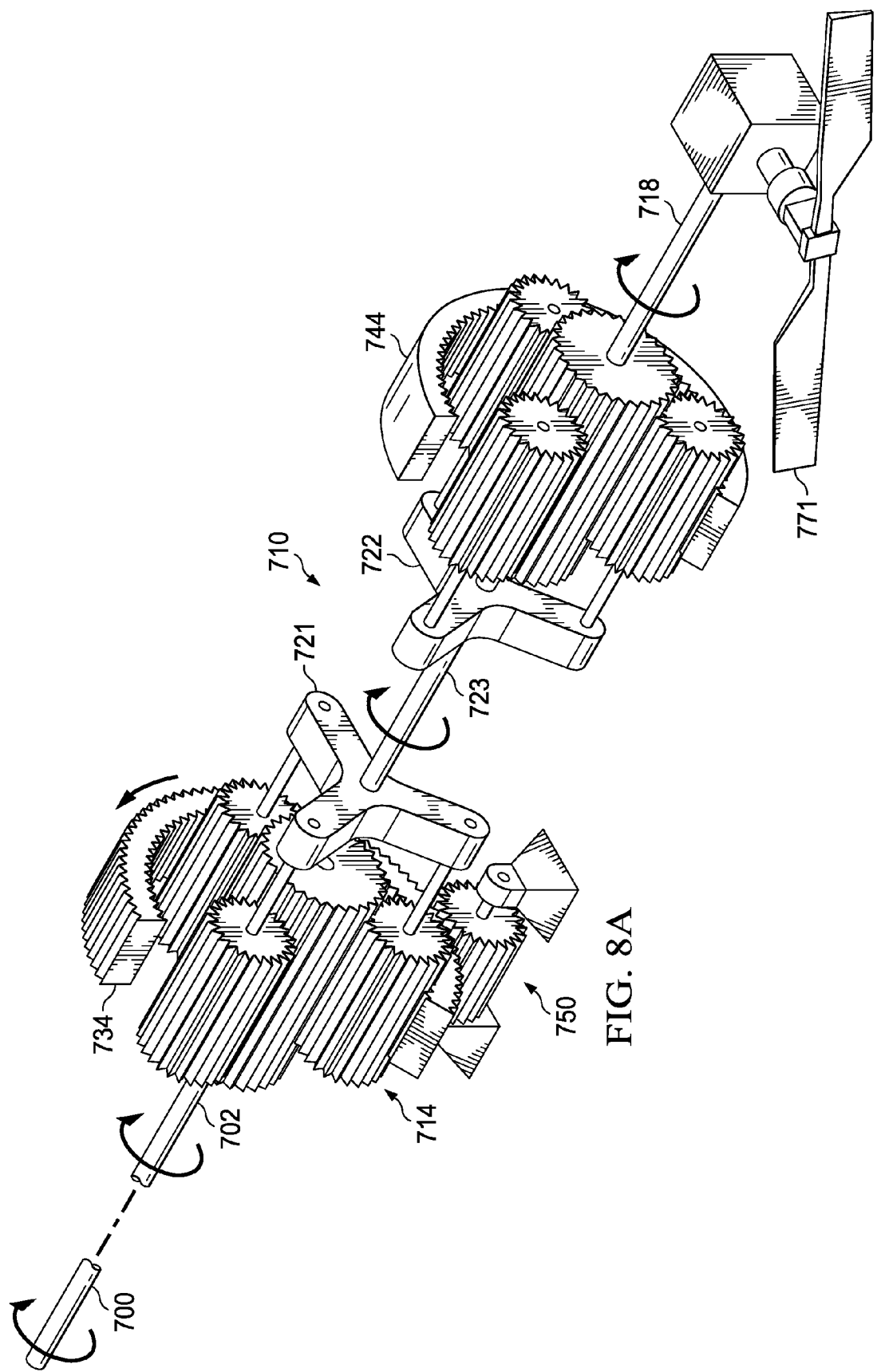
FIG. 8A is an oblique side view of a speed control assembly according to an embodiment of the disclosure.
Figure 8C:
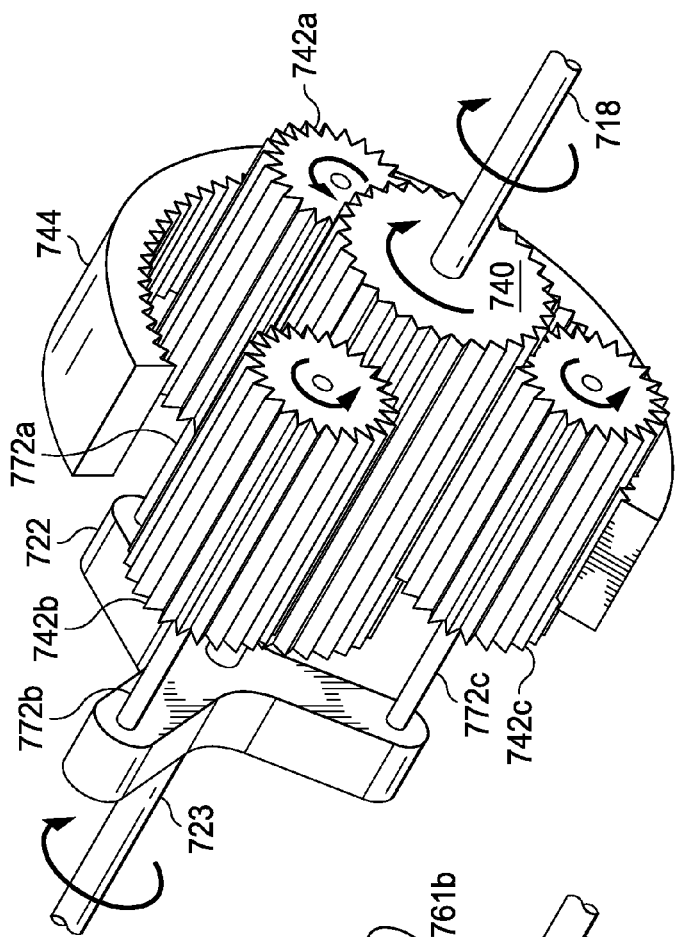
FIG. 8C is an oblique side view of the second epicyclic or planetary gear subassembly of FIG. 8A.
Figure 8B:
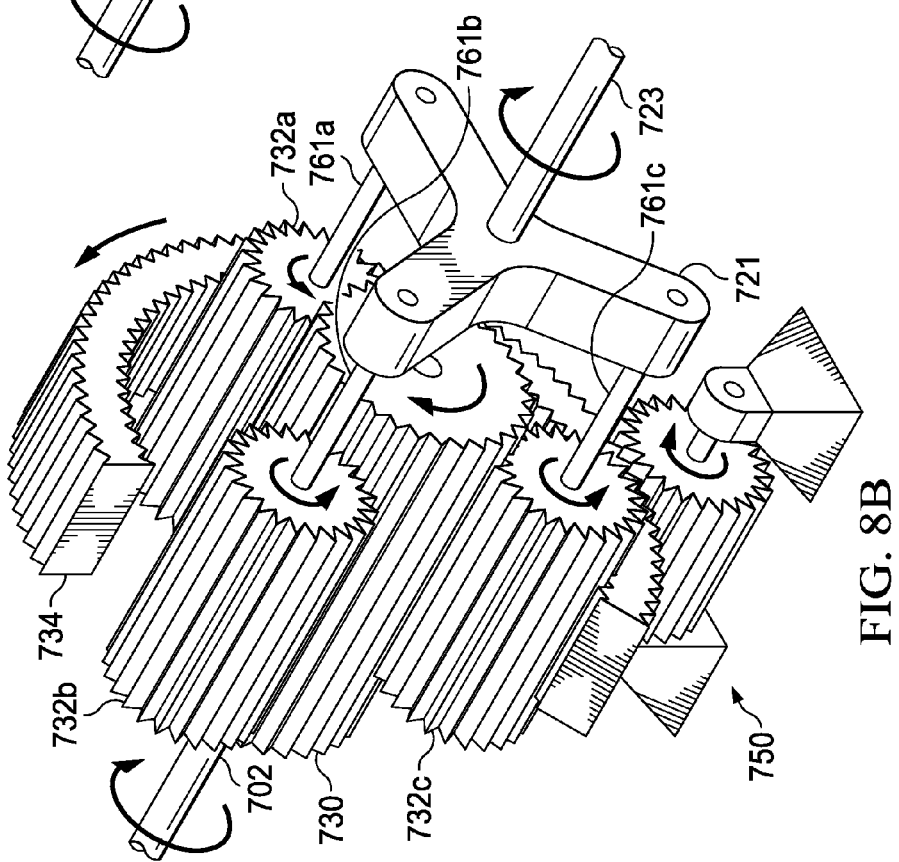
FIG. 8B is an oblique side view of the first epicyclic or planetary gear subassembly of FIG. 8A.

Referring now to FIGS. 8A, 8B, and 8C, oblique side views of a speed control assembly 710 illustrate a method of controlling an auxiliary rotor in accordance with an embodiment of the disclosure. The method of controlling the speed of an auxiliary rotor 771 may generally comprise rotating an input drive shaft 702 driven by an output shaft 700 of an engine or motor of a primary rotor and coupled to an epicyclic or planetary gear sub-assembly 714 comprising a rotatable ring gear 734. For example, an input drive shaft 702 rotates at a rotational speed $\omega_i$. Input shaft 702 may be coupled to sun gear 730 such that input drive shaft 702 and sun gear 730 rotate in unison at rotational speed $\omega_i$. A method of controlling the speed of an auxiliary rotor also comprises driving an output drive shaft coupled to the auxiliary rotor by rotating the input shaft. From the arrows, it may be seen that clockwise rotation of input shaft 702 drives a clockwise rotation of sun gear 730, which in turn drives counterclockwise axial rotation of planet gears 732a, 732b, 732c, and the axial rotations of planet gears 732a, 732b, 732c drive a clockwise planetary rotation of planet gears 732a, 732b, 732c around sun gear 730. Clockwise planetary rotation of planet gears 732a, 732b, 732c in turn drive the clockwise planetary rotation of shafts 761a, 761b, 761c. The clockwise planetary rotations of 761a, 761b, 761c, each of which are coupled to planet gears 732a, 732b, 732c, respectively, at one end and to carrier 721 at the other, drive clockwise rotation of carrier 721, shaft 723, and carrier 722. Carrier 721, shaft 723, and carrier 722 may be integrally formed such that carrier 721, shaft 723, and carrier 722 rotate in unison at rotational speed $\omega_1$. The clockwise rotation of carrier 722 drives the planetary rotation of shafts 772a, 772b, 772c and planet gears 742a, 742b, 742c by way of a configuration similar to that shared between carrier 721, shafts 761a, 761b, 761c, and planet gears 732a, 732b, 732c. The clockwise rotation of carrier 722 also drives the counter-clockwise axial rotation of planet gears 742a, 742b, 742c. Because gear ring 744 is fixed in place, 100% of the planetary and axial rotations of planet gears 742a, 742b, 742c drive the clockwise rotation of sun gear 740 and output drive shaft 718, which may be coupled to sun gear 740 such that sun gear 740 and output drive shaft 718 rotate in unison at rotational speed $\omega_o$. Thus, FIGS. 8A-8C illustrate an embodiment of the disclosure whereby rotation of an input drive shaft drives an output drive shaft coupled to an auxiliary rotor.

Still referring to FIGS. 8A-8C, the method of controlling the speed of an auxiliary rotor may also comprise adjusting a drive speed ratio $\omega_o:\omega_i$ by controlling a rotational speed of the rotational ring gear 734. In an embodiment, the rotatable ring gear 734 rotates axially opposite to the axial rotation of the input drive shaft. This counter-rotation of rotatable ring gear 734 drives axial and planetary rotation of planet gears 732a, 732b, 732c in a rotational direction opposite to the axial rotation of input drive shaft 702, thus reducing the net planetary and axial rotational speeds of planet gears 732a, 732b, 732c. The decrease in the planetary rotational speed of planet gears 732a, 732b, 732c carries through to output drive shaft 718 by way of the mechanical relationships of the components of the speed control assembly therebetween, resulting in a reduced drive speed ratio $\omega_o:\omega_i$. Thus, FIGS. 8A-8C illustrates an embodiment of the disclosure wherein the drive speed ratio $\omega_o:\omega_i$, is adjusted by controlling the rotational speed of a rotatable gear.

Still referring to FIGS. 8A-8C, in various embodiments the rotatable gear 734 may be prevented from rotating, or even reversed. As a result, the rotational speed $\omega_o$ of output drive shaft 718 is not altered by counter-rotation of rotatable gear 734. In an embodiment, the gear ratios of the first and second epicyclic or planetary subassembly gears are selected so as to provide a $\omega_o:\omega_i$ ratio of 1:1 when the rotatable ring gear is held stationary. The rotatable ring gear may be held stationary by a rotation speed adjustment device such as a brake or a drive motor delivering a tangential counterforce sufficient to suppress counter-rotation of the rotatable ring gear 734.

In some embodiments, the method of controlling the speed of an auxiliary rotor 771 allows for the free rotation of the rotatable gear without any interference from the rotation speed adjustment device 750. Counter-rotation of the rotatable ring gear 734 relative to the rotation of the input drive shaft 702 may be induced by axial rotation of input drive shaft 702 itself. While not wishing to be limited by theory, it is believed that angular momentum from the rotation of input drive shaft 702 is conveyed to rotatable ring gear 734 through the chain of mechanically interlinked components connecting the rotatable ring gear 734 to input drive shaft 702, inducing counter-rotation of rotatable ring gear 734. This operating state (e.g., free counter-rotation of rotatable ring gear 734 driven by the rotation of input drive shaft 702) may be advantageous in that additional energy is not required to operate a rotation speed adjustment device in order to reduce the rotational speed of the output drive shaft 718, an auxiliary rotor 771 coupled to the output drive shaft 718, or a combination thereof.

In an embodiment, the rotatable ring gear 734 may counter-rotate relative to a rotation of the input drive shaft 702 at a speed sufficient to stop rotation of the output drive shaft 718. While not wishing to be bound by theory, it is believed that the contribution to the speed of planetary rotation of planet gears 732a, 732b, 732c attributable to axial rotation of the input drive shaft 702 is equal in magnitude and opposite in sign to the contribution to the speed of planetary rotation of planet gears 732a, 732b, 732c attributable to the counter-rotation of rotatable ring gear 734. In an embodiment, the rotation speed adjustment device increases the rate of counter-rotation of the rotatable ring gear 734 beyond the rotational speed achieved by the rotatable ring gear 734 in a freely spinning state. Increasing the rate of counter-rotation beyond the rotational speed of the rotatable ring in a freely spinning state may compensate for frictional inefficiencies, other mechanical inefficiencies of the speed control assembly 710, and the angular momentum of the input drive shaft 702 lost to downstream components of the speed control assembly 710.

In some embodiments, the rotating of the rotatable ring gear 734 is controlled using a brake, a motor, a pump, or a combination thereof. In some embodiments, the method of controlling the speed of an auxiliary rotor comprises rotating the auxiliary rotor coupled to the output drive shaft at a speed different than the speed of a primary rotor coupled to the input drive shaft. The difference in speed may be the result of the gear ratios chosen for the individual gear assemblies, the result of counter-rotation of the rotatable ring gear, the result of adjustment of the rotational speed of the rotational ring gear via a rotation speed adjustment device, or any combination thereof.

Various methods of controlling the speed of an auxiliary rotor embodied herein may be utilized to control the tail rotor of a helicopter. In an embodiment, the method of controlling the speed of an auxiliary rotor is utilized to control the noise generated by the helicopter tail rotor by adjusting the drive speed ratio $\omega_o:\omega_i$, of the input and output drive shafts. The drive speed ratio $\omega_o:\omega_i$ may be adjusted by adjusting the speed of the rotatable gear ($\omega_{rg}$) relative to the speed of the input drive shaft ($\omega_i$). In some embodiments, the method of controlling the speed of an auxiliary rotor is utilized such that the rotational speed of the tail rotor of a helicopter may be controlled independent of a primary rotor of the helicopter. The counter-rotation of the rotatable ring gear, which may be assisted by a rotation speed adjustment device, allows the rotational speed of the auxiliary rotor to be adjusted without changing the rotational speed of the primary rotor. Methods of controlling the speed of an auxiliary rotor in accordance with various embodiments of the disclosure may be used to maintain a rotational speed of a helicopter while a rotational speed of a primary rotor of the helicopter varies.

Figure 9:
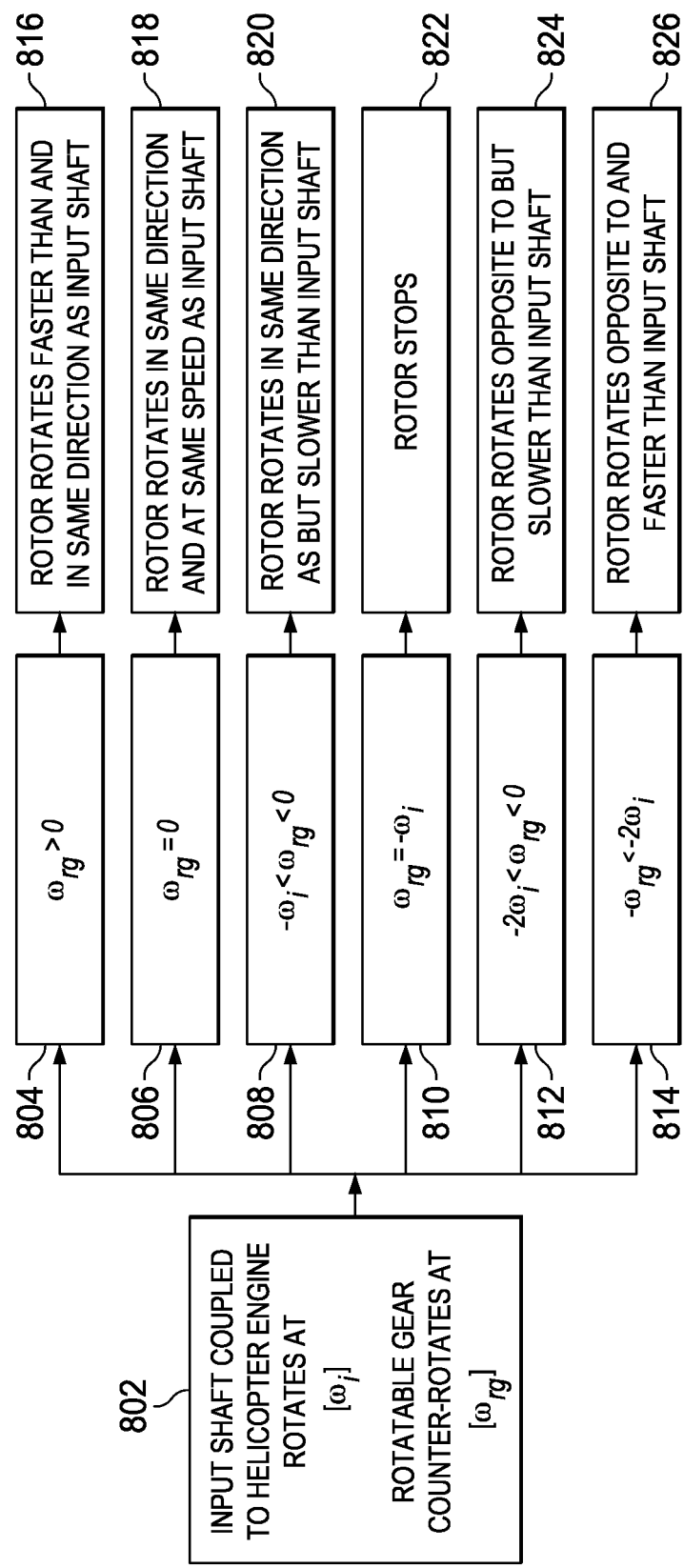
FIG. 9 is a flow diagram of a method of controlling the speed of a helicopter tail rotor according to an embodiment of the disclosure.

FIG. 9 illustrates an exemplary embodiment of a method of adjusting noise of a helicopter tail rotor according to an embodiment of the disclosure. For simplicity, the equations of FIG. 9 assume (1) use of a speed control assembly similar in design to the speed control assembly 1 of FIG. 2; and (2) that all mechanically engaged gears of the speed control assembly share a 1:1 gear ratio. From blocks 804, 816 it may be seen that the tail rotor rotates faster than and in the same direction as the input shaft of the speed control assembly when $\omega_{rg}>0$. From blocks 806, 818 it may be seen that the tail rotor rotates in the same direction and at the same speed as the input shaft of the speed control assembly when $\omega_{rg}=0$. From blocks 808, 820 it may be seen that the tail rotor rotates in the same direction but slower than the input shaft of the speed control assembly when $-\omega_i<\omega_{rg}<0$. From blocks 810, 822 it may be seen that the tail rotor stops when $\omega_{rg}=-\omega_i$. From blocks 812, 824 it may be seen that the tail rotor rotates opposite to but slower than the input shaft of the speed control assembly when $-2\omega_i<\omega_{rg}<0$. From blocks 814, 826 it may be seen that the tail rotor rotates opposite to and faster than the input shaft of the speed control assembly when $-\omega_{rg}<-2\omega_i<0$. From FIG. 9, it may be seen speed control assemblies according to various embodiments of the disclosure may facilitate broad control over the speed of a helicopter tail rotor independent of the velocity of an input drive shaft. However, the mathematical relationships shown in FIG. 9 are provided for the purposes of illustration only, and it should be understood that the relationships illustrated in blocks 804, 806, 808, 810, 812, 814 and also the functionality illustrated in blocks 816, 818, 820, 822, 824, 826 may vary as a function of the control scheme for and the design of the speed control assembly.

In various embodiments, the method of controlling the speed of an auxiliary rotor may further comprise adjusting the noise generated by a tail rotor of a helicopter coupled to the output drive shaft. By increasing a counter-rotation of a rotational gear of a speed control assembly in accordance with an embodiment of the disclosure a speed of a helicopter tail rotor coupled to an output drive shaft may be reduced, thus lowering the noise generated by the helicopter tail rotor. When the speed of a main rotor of a helicopter is increased, the input drive shaft to the speed control assembly also increases. To counter-act the increase in noise that would otherwise occur from a faster-rotating helicopter tail rotor, the counter-rotation of the rotatable ring of the speed control assembly may be increased to prevent all or some of the increase in the speed of the tail rotor, thus preventing all or some of the additional noise that would have otherwise been generated by the tail rotor. In other embodiments where the auxiliary rotor comprises the tail rotor of a helicopter, a method of controlling the speed of an auxiliary rotor may be used to adjust the noise generated by the tail rotor over a change in altitude by adjusting the drive speed ratio $\omega_o:\omega_i$. Although not wishing to be bound by theory, it is believed that the noise generated by a helicopter tail rotor varies as a function of tail rotor speed, of the thickness of the air at different altitudes, and by the distance between the helicopter tail rotor and a listener.

Figure 10A:
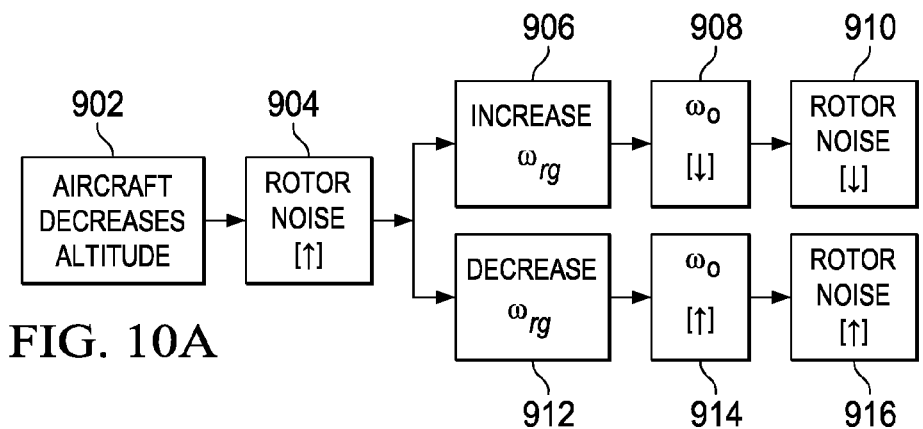
FIGS. 10A-10C are flow diagrams of a method of adjusting noise of a helicopter tail rotor according to an embodiment of the disclosure.
Figure 10B:
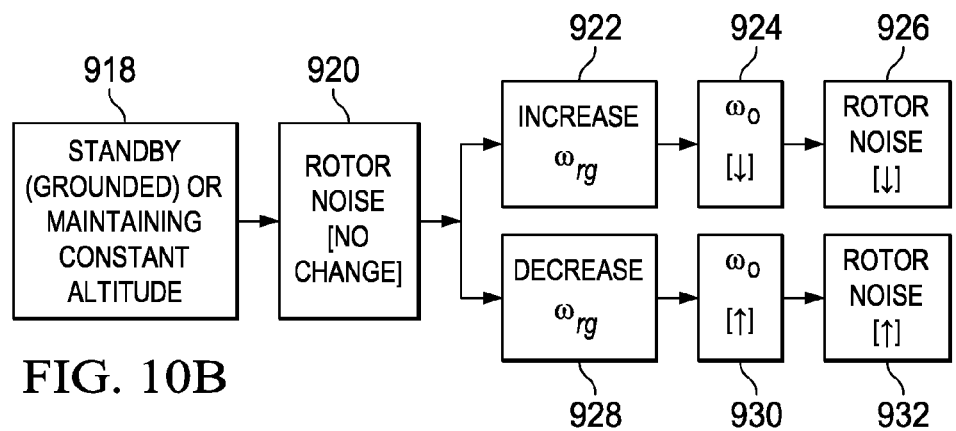
Figure 10C:
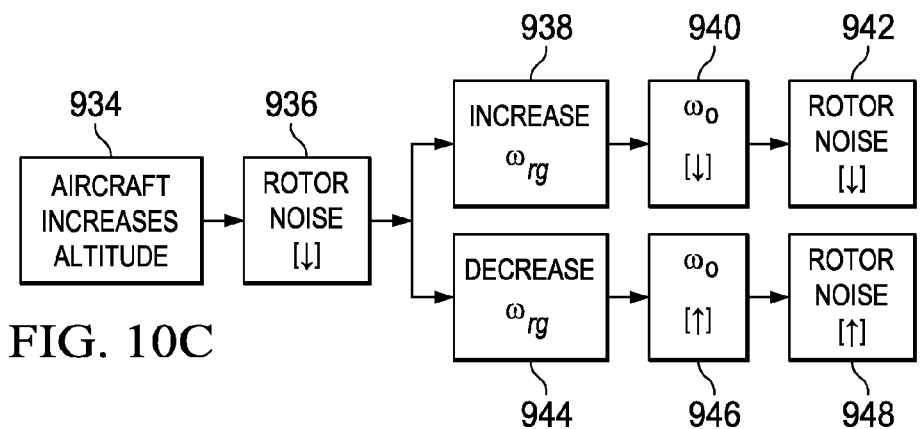

The flow diagrams of FIGS. 10A-10C illustrate a method of adjusting noise of a helicopter tail rotor in accordance with an embodiment of the disclosure. For simplicity, the rotational velocity of the input drive shaft is assumed constant between adjacent blocks except where otherwise indicated by one of the blocks. The upward pointing arrows shown in brackets indicate that the variable directly above has increased as a result of the action indicated in the preceding block. The downward pointing arrows shown in brackets indicate that the variable directly above has decrease as a result of the action indicated in the preceding block. Blocks 918, 920, 902, 904, 934, 936 illustrate that, given a constant tail rotor speed, a decrease in altitude increases and an increase in altitude decreases the noise generated by a helicopter tail rotor. Blocks 906, 908, 910, 922, 924, 926, 938, 940, 942 illustrate that increasing the counter-rotational velocity of the rotatable gear $\omega_{rg}$ reduces the tail rotor noise by reducing the velocity of the output drive shaft. Blocks 918, 902, 904, 906, 908, 910 illustrate that increased rotor noise associated with a decrease in altitude can be at least partially offset by increasing the counter-rotational velocity of the rotatable gear $\omega_{rg}$. Blocks 912, 914, 916, 928, 930, 932, 944, 946, 948 illustrate that decreasing the counter-rotational velocity of the rotatable gear $\omega_{rg}$ increases the tail rotor noise by reducing the velocity of the output drive shaft. Blocks 918, 934, 936, 944, 946, 948 illustrate that decreased noise associated with an increase in altitude may be at least partially offset by decreasing the counter-rotational velocity of the rotatable gear $\omega_{rg}$, which may be advantageous in instances where the higher speeds of the tail rotor are needed to provide greater maneuverability of and control over the helicopter. Thus, various embodiments of the speed control assembly and methods of controlling an auxiliary rotor described herein may advantageously provide improved control over tail rotor noise and helicopter maneuverability over a greater range of operational conditions.

Various embodiments of the speed control assemblies and methods of controlling the speed of an auxiliary rotor disclosed herein may advantageously allow the tail rotor of a helicopter to be held at rest while a primary rotor of the helicopter continues to operate at operational or standby speeds to rotate at substantially reduced speeds in comparison to the speed of the tail rotor in the absence of counter-rotation of a rotation velocity adjustment device; or a combination thereof. Various embodiments of the speed control assemblies and methods of controlling the speed of an auxiliary rotor disclosed herein may also advantageously allow a pilot, computer, or a combination thereof to select tail rotor speeds independent of the main rotor of the helicopter (e.g., the speed of the tail rotor may be adjusted without requiring further adjustment to the speed of the primary rotor. By providing a means for independently controlling the speed of a helicopter tail rotor, the safety of operating a helicopter may advantageously be improved, especially in those situations where bystanders, passengers, crew, or any combination thereof are exposed to the tail rotor, such as during standby, loading, boarding, disembarking, landing, and takeoff. In addition, the speed control is accomplished while maintaining a positive mechanical linkage between the engine and the tail rotor.

In various embodiments, speed control assemblies and methods of controlling an auxiliary rotor of the disclosure may be utilized to maneuver rotor-propelled vehicles. For example, by coupling a speed control assembly in accordance with an embodiment of the disclosure to a tail rotor of a helicopter, the independent control of the tail rotor speed may facilitate maneuvering of the helicopter by providing the helicopter pilot with an additional degree of freedom (e.g., independent rotation of the tail rotor) with which to control the direction and movement of the helicopter. Rotation of the primary rotor may be adjusted by a pilot to achieve one navigational objective (e.g., a change in altitude), while the drive speed ratio $\omega_o:\omega_i$ may be adjusted to achieve a second navigational objective (e.g., orientation of the helicopter).

In some embodiments, a speed control assembly of the disclosure, a method of controlling the an auxiliary rotor, or a combination thereof may be utilized to manage the noise generated by a tail rotor of a rotorcraft over a range of altitudes without sacrificing maneuverability of the rotorcraft.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Detailed Description of the Embodiments is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A speed control assembly, comprising:
an input drive shaft coupled to a first gear subassembly comprising a rotatable gear;
a second gear subassembly coupled to an output drive shaft; and
a linkage coupling the first gear subassembly to the second gear subassembly,
wherein the input drive shaft, the first gear subassembly, the second-gear subassembly, and the linkage are configured such that a rotational speed of the rotatable gear adjusts a ratio of a speed of the output drive shaft to a speed of the input drive shaft; and
wherein the second gear subassembly comprises a second epicyclic gear subassembly comprising a sun gear coupled to the output drive shaft, one or more planet gears, and a fixed ring gear.

2. The assembly of claim 1, wherein the first gear subassembly comprises a first epicyclic gear subassembly comprising a sun gear coupled to the input drive shaft, one or more planet gears, and the rotatable gear, and wherein the rotatable gear comprises a ring gear of the first epicyclic gear subassembly.

3. The assembly of claim 1, further comprising a counter-rotation device coupled to the ring gear and configured to adjust a speed of counter-rotation of the rotatable gear relative to the sun gear coupled to the input drive shaft.

4. The assembly of claim 1, wherein the linkage comprises a first carrier coupled to each of the one or more planet gears of the first epicyclic gear subassembly and a second carrier coupled to each of the one or more planet gears of the second epicyclic gear subassembly.

5. The assembly of claim 4, wherein an intermediate shaft couples the first carrier to the second carrier.

6. The assembly of claim 1, wherein the linkage comprises a carrier, and wherein the carrier is coupled to each of the one or more planet gears of the first epicyclic gear subassembly on a first side of the carrier and to each of the one or more planet gears of the second epicyclic gear subassembly on a second side of the carrier.

7. The method of claim 1, wherein the linkage comprises one or more intermediate shafts, and wherein each of the one or more intermediate shafts couples a planet gear of the first epicyclic gear subassembly to a planet gear of the second epicyclic gear subassembly.

8. The assembly of claim 1, further comprising a rotation speed adjustment device coupled to the rotatable gear.

9. The assembly of claim 1, wherein the speed control assembly is configured to stop a rotation of the output drive shaft.

10. A speed control assembly, comprising:
an input drive shaft coupled to a first gear subassembly comprising a rotatable gear;
a second gear subassembly coupled to an output drive shaft; and
a linkage coupling the first gear subassembly to the second gear subassembly,
wherein the input drive shaft, the first gear subassembly, the second-gear subassembly, and the linkage are configured such that a rotational speed of the rotatable gear adjusts a ratio of a speed of the output drive shaft to a speed of the input drive shaft; and
a tail rotor of a helicopter, wherein the tail rotor comprises two or more blades and is coupled to the output drive shaft.

11. The method of claim 10, further comprising a fuselage and an engine of the helicopter, and wherein the speed control assembly couples the engine to the tail rotor within the fuselage.

12. A method of controlling the speed of an output drive shaft, comprising:
rotating an input drive shaft coupled to a gear subassembly comprising a rotatable ring gear, wherein an output drive shaft is mechanically coupled to the rotatable ring gear; and
adjusting a drive speed ratio by controlling a rotational speed of the rotatable ring gear, wherein the drive speed ratio is the ratio of a rotational speed of the output drive shaft to a rotational speed of the input drive shaft;
wherein the input drive shaft is coupled to a transmission that is coupled to an engine and a helicopter main rotor,
wherein a helicopter tail rotor is coupled to the output drive shaft, and
wherein rotating the rotatable gear in a radial direction opposite to a rotational direction of the input drive shaft slows a rotational speed of the output drive shaft.

13. A method of controlling the speed of an output drive shaft, comprising:
rotating an input drive shaft coupled to a gear subassembly comprising a rotatable ring gear, wherein an output drive shaft is mechanically coupled to the rotatable ring gear; and
adjusting a drive speed ratio by controlling a rotational speed of the rotatable ring gear, wherein the drive speed ratio is the ratio of a rotational speed of the output drive shaft to a rotational speed of the input drive shaft;
wherein the output drive shaft is coupled to a tail rotor of a helicopter and further comprising adjusting the noise of the tail rotor by adjusting the drive speed ratio.

14. The method of claim 13, wherein the rotatable ring rotates in a radial direction opposite to a rotational direction of the input drive shaft.

15. The method of claim 13, further comprising preventing rotation of the rotatable gear such that the rotational speed of the output drive shaft is about the same as the rotational speed of the input drive shaft.

16. A method of controlling the speed of an output drive shaft, comprising:
rotating an input drive shaft coupled to a gear subassembly comprising a rotatable ring gear, wherein an output drive shaft is mechanically coupled to the rotatable ring gear; and
adjusting a drive speed ratio by controlling a rotational speed of the rotatable ring gear, wherein the drive speed ratio is the ratio of a rotational speed of the output drive shaft to a rotational speed of the input drive shaft;
wherein the output drive shaft is coupled to an auxiliary rotor of a vehicle propulsion system and further comprising maneuvering the vehicle by adjusting the drive speed ratio.

* * * * *